(12) United States Patent
Kikuchi et al.

(10) Patent No.: US 6,541,747 B1
(45) Date of Patent: Apr. 1, 2003

(54) FOCAL MECHANISM AND METHOD FOR CONTROLLING FOCAL POINT POSITION, AND APPARATUS AND METHOD FOR INSPECTING SEMICONDUCTOR WAFER

(75) Inventors: Hiroki Kikuchi, Kanagawa (JP); Asahiko Nogami, Tokyo (JP)

(73) Assignees: Sony Corporation, Tokyo (JP); Sony Precision Technology, Inc., Tokyo (JP)

( * ) Notice: Subject to any disclaimer, the term of this patent is extended or adjusted under 35 U.S.C. 154(b) by 0 days.

(21) Appl. No.: 09/661,890

(22) Filed: Sep. 14, 2000

(30) Foreign Application Priority Data

Sep. 14, 1999 (JP) .......................................... 11-261177

(51) Int. Cl.[7] ............................................. G02B 27/40
(52) U.S. Cl. ..................... 250/201.2; 250/372; 382/149
(58) Field of Search ........................... 250/201.2, 201.4, 250/559.38, 559.44, 559.45, 559.48, 201.3, 201.5–201.8, 372; 356/237.3, 237.5, 239.3; 382/149

(56) References Cited

U.S. PATENT DOCUMENTS

| 4,677,301 A | * | 6/1987 | Tanimoto et al. | ............ 250/548 |
|---|---|---|---|---|
| 4,815,058 A | * | 3/1989 | Nakamura et al. | ............. 369/45 |
| 5,532,874 A | * | 7/1996 | Stein | ............. 359/394 |
| 5,576,831 A | * | 11/1996 | Nikoonahad et al. | ........ 356/375 |
| 5,663,569 A | * | 9/1997 | Hayano | ................. 250/559.45 |
| 5,880,465 A | * | 3/1999 | Boettner et al. | ............ 250/234 |
| 6,034,780 A | * | 3/2000 | Kato | ............. 356/400 |
| 6,061,606 A | * | 5/2000 | Ross | ........... 700/121 |
| 6,172,373 B1 | * | 1/2001 | Hara et al. | ................. 250/548 |

\* cited by examiner

*Primary Examiner*—Kevin Pyo
*Assistant Examiner*—Seung C. Sohn
(74) *Attorney, Agent, or Firm*—Sonnenschein, Nath & Rosenthal

(57) ABSTRACT

For effecting auto-focussing of an objective lens used for observing a semiconductor wafer, a semiconductor microscopic device includes an inspection stage for supporting a semiconductor wafer and an objective lens for observing the semiconductor wafer. For automatic focussing of the objective lens, a defocussing magnitude of a light spot is detected using a knife edge. A collimator lens is oscillated by a voice coil motor to oscillate the light spot on the wafer. A peak value of the defocussing quantity detected at this time is peak-held to generate a position detection signal. The inspection stage is vertically moved so that this position detection signal will be equal to a pre-set target value.

20 Claims, 16 Drawing Sheets

FOCAL MECHANISM AND METHOD FOR CONTROLLING FOCAL POINT POSITION, AND APPARATUS AND METHOD FOR INSPECTING SEMICONDUCTOR WAFER

RELATED APPLICATION DATA

The present application claims priority to Japanese Application No. P11-261177 filed Sep. 14, 1999, which application is incorporated herein by reference to the extent permitted by law.

BACKGROUND OF THE INVENTION

1. Field of the Invention

This invention relates to a focal point position control method and a focal point position control mechanism for auto-focussing an objective lens. This invention also relates to a method and apparatus for inspecting the appearance of a semiconductor wafer.

2. Description of Related Art

A semiconductor device is produced by forming a fine device pattern on a semiconductor wafer. If, in a manufacturing process for a semiconductor device, there occurs an attachment of contaminants, pattern defects or unusual dimensions, defects are produced in the device pattern. The semiconductor device, suffering from these defects, produces rejects to lower the yield in the production process.

For maintaining the yield in the manufacturing process at a high level, it is necessary to find defects ascribable to the contaminants, pattern defects or unusual size, at an earlier stage, to locate the causes and to take effective measures for the manufacturing process. If the cause of the defects is determined quickly to take proper measures in the manufacturing process to improve the yield, it is possible to start a new process quickly to obtain a high yield in the process.

If a defect is produced in a semiconductor device, the defect is detected, using a microscopic device for inspecting the semiconductor, to search the cause of the defect, and, from the result of that search, specify the equipment or the process responsible for the defect. This microscopic device for inspecting the semiconductor is a device, such as an optical microscope, that is able to enlarge the defect on the semiconductor wafer for inspection or to image the enlarged defect to demonstrate the image on a monitor. By using this microscope device for inspecting the semiconductor, it becomes possible to discriminate the sort of the defect produced on the reject device.

According to the current design rule for the semiconductor manufacture process, the patterns prevalently have a line width of 0.18 µm, which tends to be even finer, such as 0.15 µm or 0.13 µm. In keeping pace with the tendency to use a finer design rule in the semiconductor process, fine defects which could be discounted in the past now may raise problems, requiring smaller defects to be detected.

Therefore, in a microscopic device for semiconductor inspection, an objective lens with a higher multiplying factor is needed in order to allow for observation of these fine defects.

However, an objective lens with a high multiplying factor has an extremely short depth of focus. For example, if the numerical aperture (NA) is 0.9, and the multiplying factor 100, the depth of focus is ±0.5 µm or less. It is extremely difficult to adjust the focal point position with a short depth of focus by a manual operation each time the inspection is executed. Thus, with the microscopic device for semiconductor inspection, such a mechanism is required which effects auto-focussing accurately and speedily without using a manual operation.

The conventional microscopic device for semiconductor inspection is provided with a distance detection mechanism for detecting the distance between the semiconductor wafer and the objective lens by causing the laser light or the light from an LED to fall on the objective lens through a light probe for measurement and by detecting the reflected light. In the conventional microscopic device for semiconductor inspection, the distance between the objective lens and the semiconductor wafer is controlled, based on the distance information as detected by this distance detection mechanism, in order to bring the focal point position of the objective lens into coincidence with the surface of the semiconductor wafer to be observed to enable auto-focussing.

An auto-focussing mechanism 100, used in such conventional microscopic device for semiconductor inspection, is shown in FIG. 15.

The auto-focussing mechanism 100 includes a stage 102, for supporting a semiconductor wafer 101 to be inspected, a laser diode 103 for radiating the laser light, an objective lens 104 for condensing the laser light radiated from the laser diode 103 to illuminate the semiconductor wafer 101, and a photodetector 105 for receiving the laser light reflected by the semiconductor wafer 101, as shown in FIG. 15.

The conventional auto-focussing mechanism 100 also includes a halfmirror 106 for separating the optical path for the outgoing light from the laser diode 103 from that of the reflected light from the semiconductor wafer 101, a knife edge 107 provided between the laser diode 103 and the halfmirror 106 and a collimator lens 108 provided between the half mirror 106 and the objective lens 104.

This conventional auto-focussing mechanism 100 also includes a pre-amplifier 111 for generating a position detection signal from a detection current of the photodetector 105, and a servo circuit 112 for driving the stage 102 based on the position detection signal from the pre-amplifier 111.

On the stage 102 is placed a disc-shaped semiconductor wafer 101 to be inspected. This stage 102 causes the semiconductor wafer 101, placed thereon, to be moved in the height-wise direction, that is in a direction towards and away from the objective lens 104. The stage 102 is controlled in its movement according to a driving signal supplied from the servo circuit 112.

The laser diode 103 radiates the laser light of a pre-set wavelength. The laser light radiated from the laser diode 103 has its spot shaped to a semicircular profile and is incident in this state on the half mirror 106. The half mirror 106 reflects the laser light radiated from the laser diode 103. The laser light, reflected by the half mirror 106, is collimated by the collimator lens 108 into a parallel light beam which then falls on the objective lens 104. The objective lens 104 converges the collimated laser light to illunminate the semiconductor wafer 101.

The laser spot formed on the semiconductor wafer 101 has a semicircular shape because of the provision of the knife edge 107.

The laser light, converged by the objective lens 104, is reflected by the semiconductor wafer 101, and is again passed through the objective lens 104 and the collimator lens 108 to fall again on the half mirror 106. The half mirror 106 now transmits the reflected light from the semiconductor wafer 101. The reflected light, transmitted through the half mirror 106, is illuminated on the photodetector 105.

The photodetector 105 is conjugated in its arraying position with respect to the laser diode 103. The photodetector 105 receives the reflected light from the semiconductor wafer 101 and converts the reflected light into electrical signals which are routed to the pre-amplifier 111.

The pre-amplifier 111 finds a difference signal, indicating the position of the center of gravity of a laser spot formed on the photodetector 105, from the electrical signals supplied from the photodetector 105. From the difference signal, the pre-amplifier 111 generates a distance detection signal indicating the distance between the semiconductor wafer 101 and the objective lens 104.

The servo circuit 112 drives the stage 102 in the heightwise direction, so that the supplied distance detection signal is equal to a target value, to execute servo control. By setting the target value so as to be equal to the focal length of the objective lens 104, the height-wise position of the semiconductor wafer 101 is brought into coincidence with the focal point position of the objective lens 104.

The principle of the distance detection by this conventional auto-focussing mechanism 100 is hereinafter explained.

The laser spot formed on the semiconductor wafer 101 is of a semicircular profile due to the presence of the knife edge 107. The laser spot formed on the semiconductor wafer 101 is smallest in spot size if the focal point position is coincident with the reflecting surface, as shown in FIG. 16. The farther the reflecting surface is separated from the focal point position, the larger is the spot size. The light spot shape is symmetrical, with respect to spot position as focussed, on both sides of the focal point position.

In this manner, the laser spot formed on the semiconductor wafer 101 has its center-of-gravity position moved linearly in proportion to the amount of deviation of the focal point position. This deviation in the center-of-gravity position reflects itself on the photodetector 105.

Using the photodetector 105, having its light detection area split into plural sub-areas, the deviation in the laser spot receiving position is detected by detecting e.g., the difference in the light volumes received by the respective sub-areas. From this deviation in the center-of-gravity position, the amount of deviation of the focal point position of the laser spot in the semiconductor wafer 101 is found to detect the distance between the semiconductor wafer 101 and the objective lens 104.

In the conventional microscopic device for seminconductor inspection, the focal length between the semiconductor wafer 101 and the objective lens 104 is set, using the above-described auto-focussing mechanism 100. Then, using the objective lens 104, the device pattern on the semiconductor wafer 101 is enlarged and observed.

There is formed on the semiconductor wafer a metal interconnection of aluminum or copper interconnecting the transcribed circuits. The metallic interconnection is generally a stereo interconnection over plural layers. Between the respective interconnection layers, there are formed inter-layer insulating films of, for example, $SiO_2$, to maintain electrical insulation. In the manufacturing process, an inter-layer insulating film is formed to a thickness of approximately 1 $\mu$m, and the metallic interconnection is formed thereon. Another inter-layer insulating film and the next metallic interconnection are formed thereon. The above-described process is repeated a number of times. The microscopic device for semiconductor inspection may be used for inspecting line breakages or shorting of the metallic interconnections.

However, the inter-layer insulating film for the semiconductor wafer is usually formed of silicon dioxide, and transmits light. Therefore, if a laser spot is formed on the semiconductor wafer, using the auto-focussing mechanism 100, the distance to the metallic interconnection can be detected if the spot is on the semiconductor wafer, as shown at X in FIGS. 17A and 17B. However, if the spot is on the inter-layer insulating film, as shown at Y in FIGS. 17A and 17B, the reflecting surface is at a lower level than the metallic interconnections, so that it is impossible to detect the distance to the metallic interconnections under inspection.

Thus, in the conventional microscopic device for semiconductor inspection, provided with the auto-focussing mechanism, it has been difficult to automatically focus the objective lens on the metallic interconnections formed on the inter-layer insulating film.

SUMMARY OF THE INVENTION

It is therefore an object of the present invention to provide a focal point position control mechanism and a focal point position control method for automatic focussing of the objective lens, and a semiconductor wafer inspecting method and apparatus for automatic focussing of the objective lens and for inspecting the appearance of the semiconductor wafer.

In one aspect, the present invention provides a focal point position control mechanism including means for supporting an object for illumination formed by a light-transmitting material and a light reflecting pattern formed thereon, means for illuminating light converged by an objective lens on the object of illumination supported by the supporting means, means for detecting the distance between the light reflecting pattern and the objective lens, by forming a light spot on the object of illumination using the objective lens and by detecting the reflected light from the light spot thus formed and means for controlling the shifting of the supporting means and/or the objective lens according to the distance between the light reflecting pattern and the objective lens as detected by the distance detection means, for bringing the distance between the light reflecting pattern and the objective lens into coincidence with the focal length of the objective lens. The distance detection means causes the light spot formed on the object of illumination to be oscillated in the horizontal direction with respect to the object of illumination to detect the distance between the light reflecting pattern and the objective lens.

In this focal point position control mechanism, the light spot formed on the object of illumination is oscillated in the horizontal direction relative to the object of illumination, and the distance between the light reflection pattern and the objective lens is detected to bring the focal point position of the objective lens into coincidence with the light reflection pattern forming position.

In another aspect, the present invention provides a method for controlling the focal point position in which a focal point position of an objective lens adapted for illuminating light converged on an object of illumination formed by a light-transmitting material and a light reflecting pattern formed thereon is brought into coincidence with the position in which the reflective pattern is formed. The method includes forming a light spot on the object of illumination using the objective lens, causing oscillations of the light spot formed on the object of illumination in a horizontal direction relative to the object of illumination, detecting the reflected light from the light spot thus formed to detect the distance between the light reflecting pattern and the objective lens and bringing the distance between the light reflecting pattern and the objective lens into coincidence with the focal length of the objective lens according to the distance between the light reflecting pattern and the objective lens as detected.

In this focal point position controlling method, the light spot formed on the object of illumination is oscillated in the horizontal direction relative to the object of illumination, and the distance between the light reflection pattern and the objective lens is detected to bring the focal point position of the objective lens into coincidence with the light reflection pattern forming position.

In still another aspect, the present invention provides an apparatus for inspecting a semiconductor wafer including supporting means for supporting a semiconductor wafer carrying a metallic interconnection, means for illuminating the light converged by an objective lens on a semiconductor wafer carried by the supporting means, means for detecting the distance between the metallic interconnection and the objective lens, by forming a light spot on the object of illumination using the objective lens, and by detecting the reflected light from the light spot, thus formed, control means for controlling the shifting of the supporting means and/or the objective lens according to the distance between the metallic interconnection and the objective lens as detected by the distance detection means for bringing the distance between the metallic interconnection and the objective lens into coincidence with the focal length of the objective lens, photographing means for photographing an image of the semiconductor wafer by detecting the reflected light of the light illuminated by the light illuminating means on the semiconductor wafer, and inspection means for inspecting the semiconductor wafer by processing the image photographed by the photographing means. The distance detection means causes the light spot formed on the semiconductor wafer to be oscillated in the horizontal direction with respect to the semiconductor wafer to detect the distance between the metallic interconnection and the objective lens.

In this semiconductor wafer inspecting apparatus, the light spot formed on the semiconductor wafer is oscillated in the horizontal direction relative to the metallic interconnection, and the distance between the metallic interconnection and the objective lens is detected to bring the focal point position of the objective lens into coincidence with the metallic interconnection forming position. In the present semiconductor wafer inspecting apparatus, the image of the semiconductor wafer is photographed to inspect the semiconductor wafer, as the focal point position of the objective lens is coincident with the light reflection pattern forming position.

In yet another aspect, the present invention provides a method for inspecting a semiconductor wafer in which the light converged by an objective lens is illuminated on a semiconductor wafer carrying a metallic interconnection and the reflected light is detected to inspect the semiconductor wafer. The method includes forming a light spot on the semiconductor wafer using the objective lens, oscillating the light spot formed on the semiconductor wafer relative to the semiconductor wafer, detecting the distance between the metallic interconnection and the objective lens by detecting the reflected light from the light spot formed, bringing the distance between the metallic interconnection and the objective lens into coincidence with the focal length of the objective lens based on the detected distance between the metallic interconnection and the objective lens, converging the light on the semiconductor wafer by the objective lens, photographing an image of the semiconductor wafer by detecting the reflected light of the light converged on the semiconductor wafer, and processing the photographed image to inspect the semiconductor wafer.

In this semiconductor wafer inspecting method, the light spot formed on the semiconductor wafer is oscillated in the horizontal direction relative to the metallic interconnection, and the distance between the metallic interconnection and the objective lens is detected to bring the focal point position of the objective lens into coincidence with the metallic interconnection forming position. In the present semiconductor wafer inspecting apparatus, the image of the semiconductor wafer is photographed to inspect the semiconductor wafer, as the focal point position of the objective lens remains coincident with the light reflection pattern forming position.

In the focal point position controlling method and apparatus, according to the present invention, the light spot formed on the object of illumination is oscillated in the horizontal direction relative to the object of illumination. From the reflected light of the oscillated light spot, the distance between the light reflection pattern formed on the object of illumination and the objective lens is detected to bring the focal point position of the objective lens into coincidence with the light reflection pattern forming position.

In this manner, according to the focal point position controlling method and apparatus of the present invention, the objective lens can be auto-focussed extremely readily. For example, the objective lens can be auto-focussed on a metallic interconnection formed on a light-transmitting inter-layer insulating film.

In the semiconductor wafer inspecting method and apparatus according to the present invention, the light spot formed on the semiconductor wafer is oscillated in the horizontal direction with respect to this semiconductor wafer. From the reflected light of the oscillated light spot, the distance between the metallic interconnection formed on the semiconductor wafer and the objective lens is detected to bring the focal point position of the objective lens into coincidence with the metallic interconnection forming position. In the present semiconductor wafer inspecting method, the image of the semiconductor wafer is photographed to inspect the semiconductor wafer, as the focal point position of the objective lens remains coincident with the light reflection pattern forming position.

DESCRIPTION OF THE PREFERRED EMBODIMENTS

Figure 1:
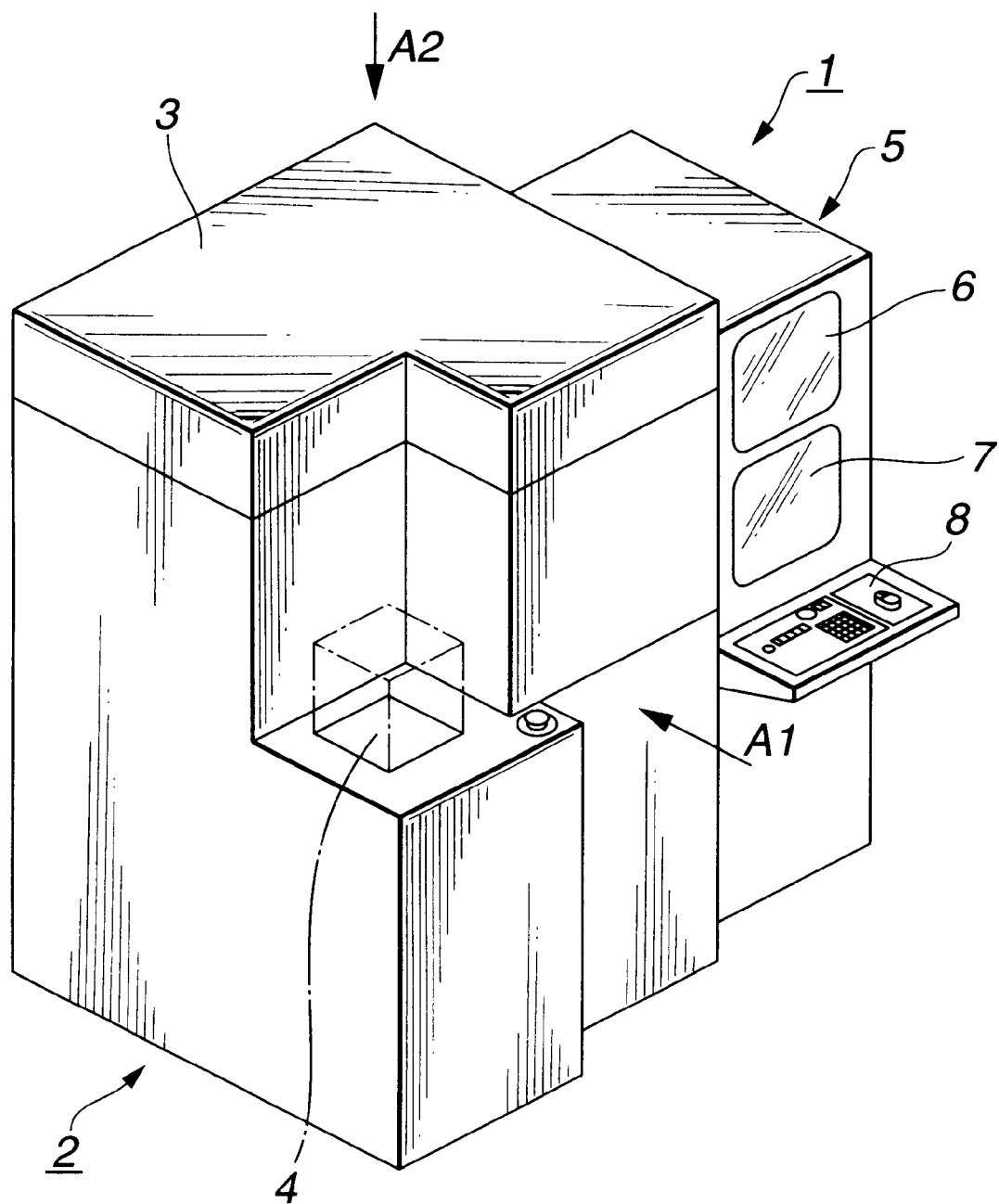
FIG. 1 shows the appearance of an inspection apparatus embodying the present invention.

Referring to the drawings, preferred embodiments of the present invention will be explained in detail.

FIG. 1 shows the appearance of an inspection apparatus embodying the present invention. This inspection device 1 is used for inspecting a semiconductor wafer having a pre-set device pattern formed thereon. If a defect is found in a semiconductor wafer carrying a pre-set device pattern, the inspection device 1 checks the nature of the defects to classify the defects.

Referring to FIG. 1, the inspection device 1 includes a clean unit 2, having a dust-proofing function to keep the inner environment clean. The clean unit 2 includes a clean air unit 3 on its top for supplying clean air freed of contaminants. From the clean air unit 3, clean air freed of contaminants is furnished to keep the cleanliness of the inner environment approximately at the class 1 cleanliness.

In this inspection device 1, a semiconductor wafer, carrying a pre-set device pattern thereon, is inspected in the clean unit 2. The semiconductor wafer being inspected is transported in a pre-set hermetically sealed vessel 4 and transferred through the vessel 4 into the inside of the clean unit 2. That is, for inspecting the semiconductor wafer, the vessel 4, charged with the semiconductor wafer, is mounted in the clean unit 2. The semiconductor wafer is taken out of the vessel 4 by a transporting robot, as later explained, without allowing the semiconductor wafer to be exposed to outside air, and is set on an inspection stage arranged in the inside of the clean unit 2.

By carrying out the seimconductor wafer inspecting operation on the inside of the clean unit 2, it is possible to prevent contaminants from attaching to the semiconductor wafer during inspection. Moreover, if the semiconductor wafer as an article under inspection is transported in a hermetically sealed vessel, and is transferred into the inside of the clean unit 2 through the intermediary of the vessel 4, it is possible to prevent contaminants from being affixed to the semiconductor wafer, by maintaining only the interior of the clean unit 2 and the vessel 4 at a sufficient degree of cleanliness, without the necessity of elevating the cleanliness of the entire environment in which is installed the inspection device 1.

By locally elevating the cleanliness of only the required site, it is possible to suppress the cost for realization of the clean environment while high cleanliness is maintained. As for the mechanical interface between the hermetically sealed vessel 4 and the clean unit 2, a so-called standard mechanical interface (SMIF) is most preferred, in which case the so-called SMIF-POD is used as the hermetically sealed vessel 4.

In this inspection device, an external unit 5, provided with a computer for actuating the inspection device 1, is mounted outside the clean unit 2. Within the external unit 5, there are mounted a display device 6 for demonstrating an photographed image of the semiconductor wafer, a display device 7 for demonstrating various inspection conditions, and an input device 8 inputting commands to the inspection device 1. An inspector of the semiconductor wafer inputs a required command from the input device 8 mounted in the external unit 5, referring to the display devices 6, 7 arranged in the external unit 5.

Figure 2:
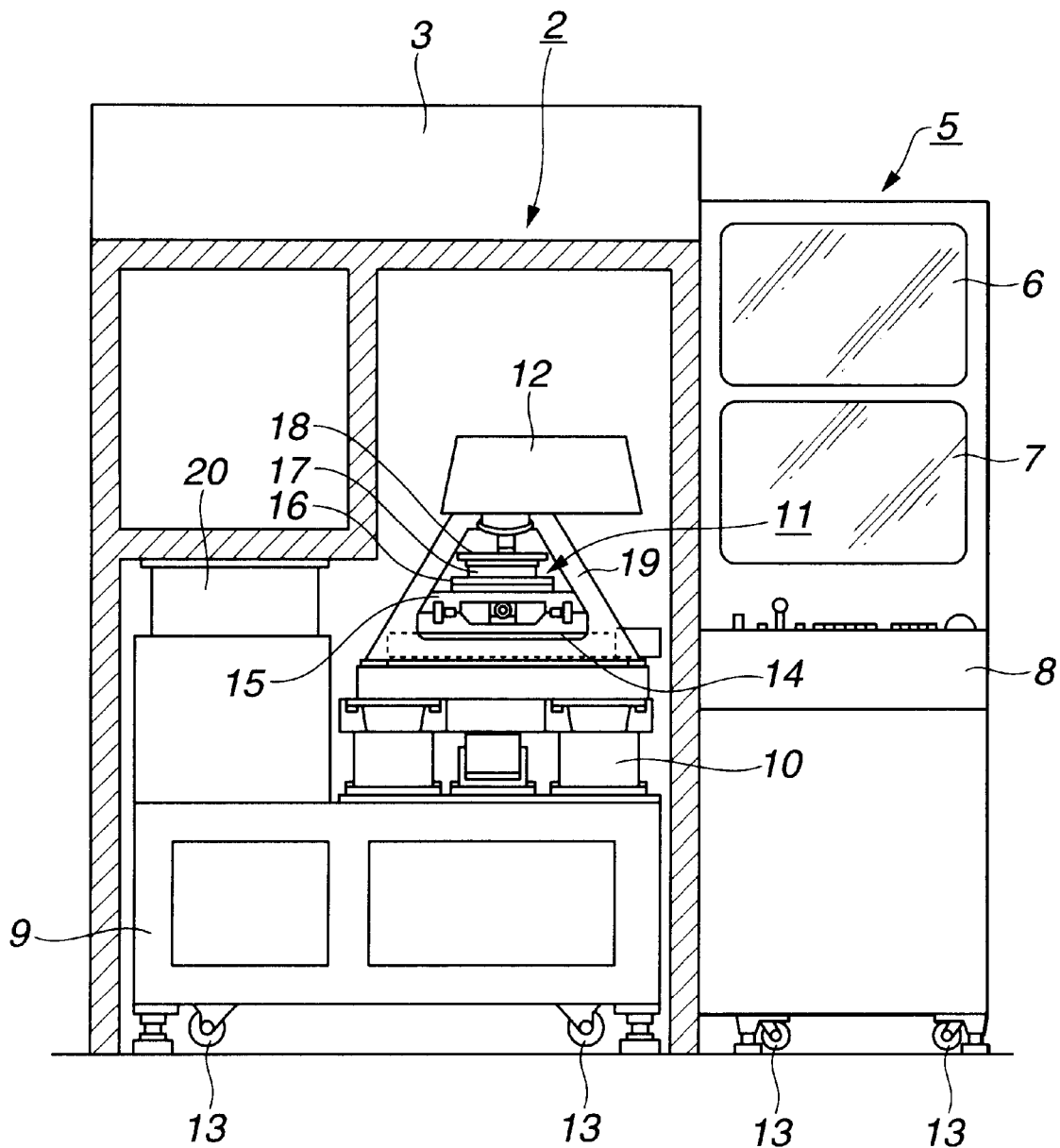
FIG. 2, showing an internal structure of a clean unit of the inspection device shown in FIG. 1, is a front view showing the inside of the clean unit as seen from the direction of arrow A2 in FIG. 1.
Figure 3:
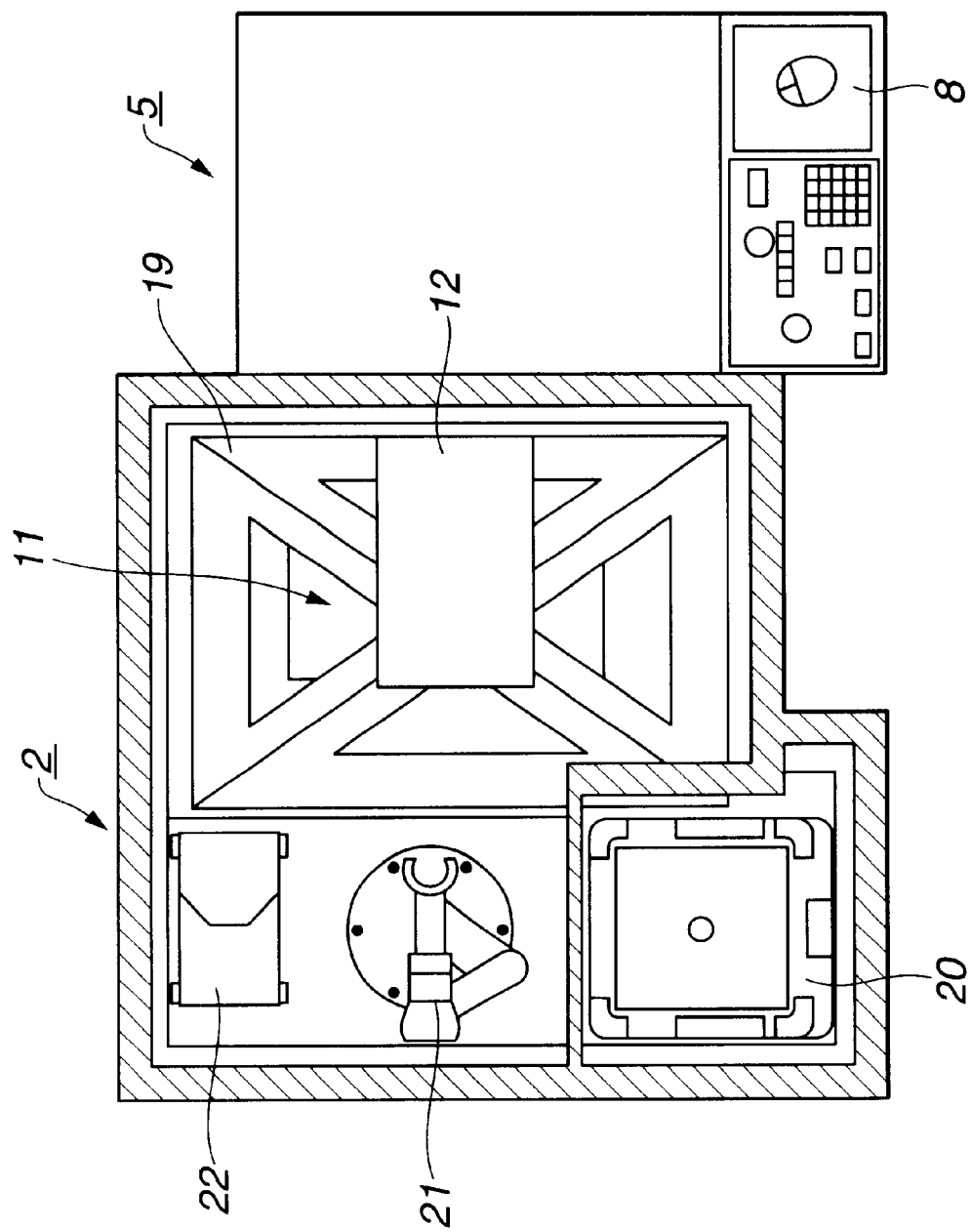
FIG. 3, showing an internal structure of a clean unit of the inspection device shown in FIG. 1, is a plan view showing the inside of the clean unit as seen from the direction of arrow A2 in FIG. 1.

Referring to FIGS. 2 and 3, the inside of the clean unit 2 of the inspection device 1 is explained. FIGS. 2 and 3 are a front view of the inside of the clean unit 2 as seen from the direction indicated by arrow A1 in FIG. 1 and a plan view of the inside of the clean unit 2 as seen from the direction indicated by arrow A2 in FIG. 1, respectively.

Referring to FIG. 2, there are mounted, in the interior of the clean unit 2, a support base 9, an anti-vibration base 10, mounted on the support base 9, an inspection stage 11, mounted on the anti-vibration base 10, and an optical unit 12, mounted on the anti-vibration base 10.

The support base 9 is a base for supporting various devices arranged within the clean unit 2. The bottom portions of the support base 9 and the external unit 5 are fitted with tires 13 to permit facilitated movement of the inspection device 1. For immobilizing the inspection device 1, securing legs are set on the floor, with the tires 13 then being floated, as shown in FIG. 2.

The anti-vibration base 10 is used for suppressing oscillations emanating from the floor or those produced on transporting the inspection stage 11. In this inspection device 1, even the slightest oscillations prove a hindrance to the inspection because it is the semiconductor wafer carrying a fine device pattern that is to be inspected. So, in the present inspection device 1, the anti-vibration base 10 is used to suppress oscillations.

As the anti-vibration base, used in the present inspection device 1, a so-called active anti-vibration base is preferred. The active anti-vibration base 10 senses the oscillations and operates in a direction of canceling the oscillations to remove the oscillations promptly, and is superior in oscillation-proofing properties.

In the present inspection device 1, in which inspection is carried out at a high resolution using UV light, the effects of the oscillations tend to be significant. However, by using the active anti-vibration base, superior in oscillation-proofing effect, as the anti-vibration base 10 of the inspection device 1, it is possible to suppress the effect of the oscillations to improve the inspection capability in high-resolution inspection with the use of the UV light.

On the anti-vibration base 10 is arranged the inspection stage 11, which is a stage for supporting a semiconductor wafer to be inspected. This inspection stage 11 has the function not only of supporting the semiconductor wafer to be inspected but also of shifting the semiconductor wafer to a pre-set position of the object of inspection.

Specifically, the inspection stage 11 includes an X-stage 14, mounted on the anti-vibration base 10, a Y-stage 15, set on the X-stage 14, a θ-stage 16, set on the Y-stage 15, a Z-stage 17, set on the θ-stage 16, and a suction plate 18, mounted on the Z-stage 17.

The X-stage 14 and the Y-stage 15 are stages moved in the horizontal direction. Specifically, the X-stage 14 and the Y-stage 15 are configured for being moved in mutually orthogonal directions. During semiconductor wafer inspection, the semiconductor wafer is moved to a position of inspection by the X-stage 14 and the Y-stage 15.

The θ-stage 16 is a so-called rotating stage and is adapted for rotating the semiconductor wafer. During semiconductor wafer inspection, the semiconductor wafer is rotated by the θ-stage 16 so that a device pattern on the semiconductor wafer, for example, will be horizontal or vertical with respect to the screen.

The Z-stage 17 is movable in the perpendicular direction for adjusting the stage height. During semiconductor wafer inspection, the stage height is adjusted by the Z-stage 17 so that the inspection surface of the semiconductor wafer will be of an appropriate height.

The suction plate 18 is used for securing the semiconductor wafer being inspected under suction. During semiconductor wafer inspection, the semiconductor wafer being inspected is set on this suction plate 18. The semiconductor wafer is sucked against movement by the suction plate 18.

On the anti-vibration base 10 is arranged the optical unit 12 which is supported by a supporting member 19 so as to lie on the inspection stage 11. During semiconductor wafer inspection, this optical unit 12 serves for photographing an image of the semiconductor wafer. This optical unit 12 has both the friction of photographing the image of the semiconductor wafer being inspected with a low resolution using the visible light and the function of photographing the image of the semiconductor wafer being inspected with a high resolution using the UV light.

Within the clean unit 2 is arranged an elevator 20 set on the support base 9, as shown in FIGS. 2 and 3. Within the clean unit 2, there are also arranged a transporting robot 21 as set on the support base 9 and an aligner 22 as set on the support base 9.

The elevator 20, transporting robot 21 and the aligner 22 serve for taking out semiconductor wafers transported as they are charged in the hermetically sealed vessel 4, such as SMIF-POD, out of the vessel 4 for setting the semiconductor wafers on the inspection stage 11.

In inspecting the semiconductor wafer, the semiconductor wafer first is charged into the hermetically sealed vessel 4 and transported. The vessel 4 is then mounted on the clean unit 2 as indicated by a chain line in FIG. 1. The semiconductor wafer is taken out by the elevator 20 from the bottom of the vessel 4 to preclude intrusion of outside air into the interior of the clean unit 2. The semiconductor wafer is housed in a magazine and is charged along with the magazine in the hermetically sealed vessel 4. From the elevator 20, the semiconductor wafers are taken out along with the magazine and lowered.

From among the semiconductor wafers, lowered by the elevator 20 along with the magazines and taken out from the vessel, the semiconductor wafer to be inspected is selected and taken out along with the magazine from the vessel 4 by the transporting robot 21. The distal end of the transporting robot 21 is fitted with a suction mechanism for sucking and enabling the transport of the semiconductor wafer.

The semiconductor wafer, taken out from the magazine by the transporting robot 21, is transported to the aligner 22. The aligner 22 effects phasing and centering of the semiconductor wafer, using an orientation flat and a notch, previously provided to the semiconductor wafer, as reference. The semiconductor wafer, thus phased and centered, is again sucked by the transporting robot 21 and transported to the inspection stage 11 where it is mounted on the suction plate 18.

As an example of the mechanism for taking out the semiconductor wafer transported as it is charged in the hermetically sealed vessel 4 for mounting it on the inspection stage 11, a type comprising the elevator 20, transporting robot 21 and the aligner 22 is given above. However, as a matter of course, the mechanism for taking out the semiconductor wafer from the vessel 4 for placing it on the inspection stage 11 is not limited to the above-given example, that is, any other suitable mechanism than that given above may be used, provided that by such mechanism, the semiconductor wafer transported as it is charged in the hermetically sealed vessel 4 can be taken out from the vessel and set on the inspection stage 11 without being exposed to ambient atmosphere.

Figure 4:
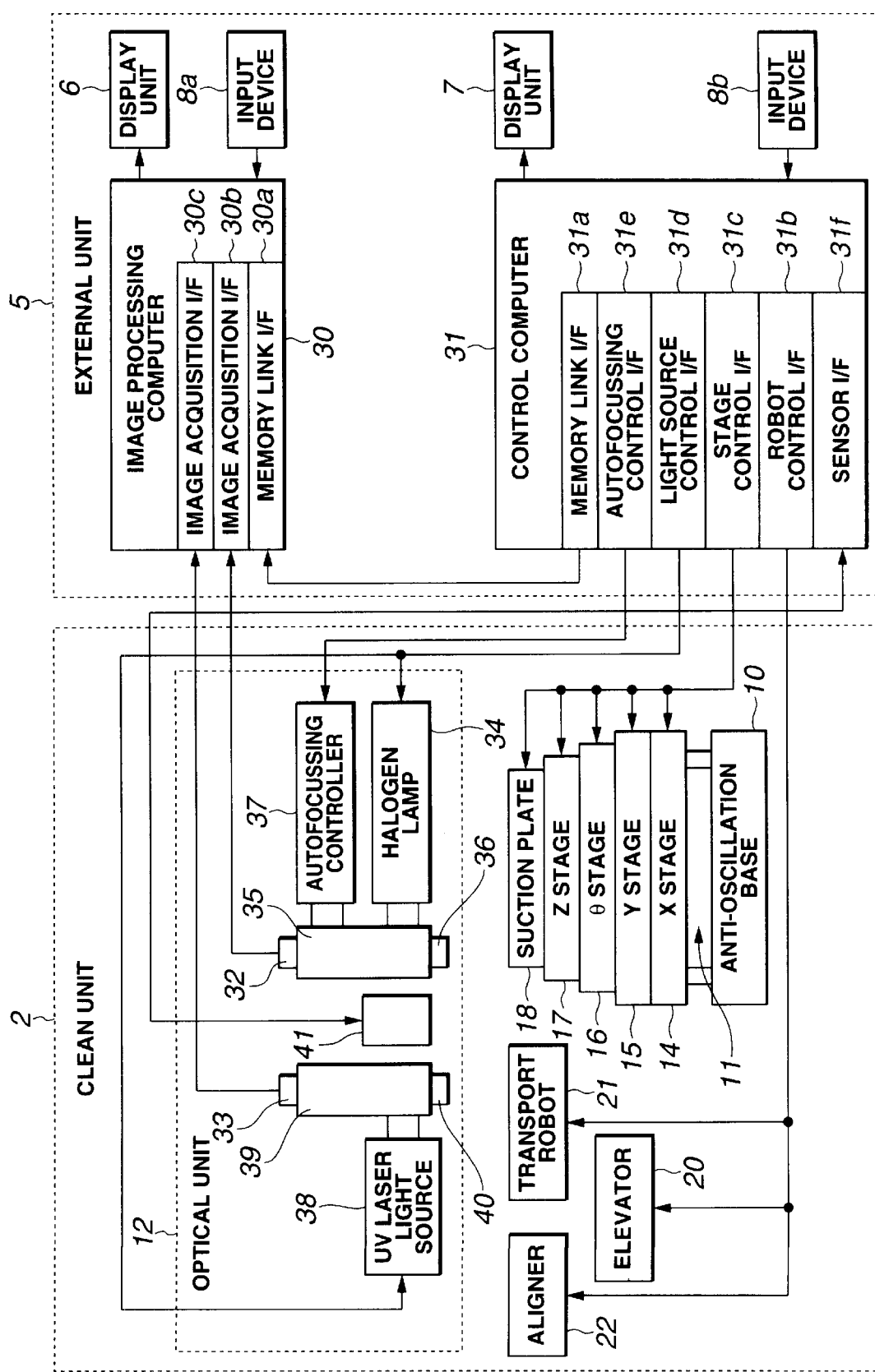
FIG. 4 is a block diagram showing the structure of the inspection device shown in FIG. 1.

Referring to the block diagram of FIG. 4, the above-described inspection device is explained more specifically.

Referring to FIG. 4, an image-processing computer 30, to which are connected the display device 6 and an input device 8a, and a control computer 31, to which are connected the display device 7 and an input device 8b, are mounted on the external unit 5 of the inspection device 1. It is noted that, in FIGS. 1 and 2, the input device 8a, connected to the image-processing computer 30, and the input device 8b, connected to the control computer 31, are collectively termed the input device 8.

The image-processing computer 30, in inspecting the semiconductor wafer, captures a photographed image of the semiconductor wafer with CCD (charge-coupled device) cameras arranged within the optical unit 12. That is, the present inspection device 1 inspects the semiconductor wafer by analyzing the image of the semiconductor wafer photographed by the CCD cameras 32, 33 installed in the optical unit 12 by processing with the image-processing computer 30.

The input device 8a, connected to the image-processing computer 30, inputs commands required for analyzing an image captured by the CCD cameras 32, 33, to the image-processing computer 30, and are made up e.g., of a pointing device, such as a mouse, or a keyboard. The display device 6, connected to the image-processing computer 30, demonstrates e.g., the results of analysis of the image captured by the CCD cameras 32, 33, and is made up e.g., of a CRT display, a liquid crystal display and so forth.

The control computer 31 is used for controlling the inspection stage 11, elevator 20, transporting robot 21, aligner 22 and respective equipment inside the optical unit 12 in inspecting the semiconductor wafer. Specifically, this inspection device 1 controls the inspection stage 11, elevator 20, transporting robot 21, aligner 22 and respective equipment in the inside of the optical unit 12, in inspecting the semiconductor wafer, so that the image of the semiconductor wafer being inspected will be photographed by the CCD cameras 32, 33 installed in the interior of the optical unit 12.

The input device 8b, connected to the control computer 31, serves to input commands necessary for controlling the inspection stage 11, elevator 20, transporting robot 21, aligner 22 and respective equipment inside the optical unit 12, to the control computer 31, and is made up of a pointing device, such as a mouse, or a keyboard. The display device 7, connected to the control computer 31, demonstrates e.g., a variety of conditions in inspecting the semiconductor wafer, and is made up e.g., of a CRT display, a liquid crystal display and so forth.

The image-processing computer 30 and the control computer 31 are able to exchange data reciprocally by a memory linking mechanism. Specifically, the image-processing computer 30 and the control computer 31 are interconnected by respective memory linking interfaces 30a, 31a, to enable the reciprocal data exchange between the image-processing computer 30 and the control computer 31.

Inside the clean unit 2 of the inspection device 1, the elevator 20, transporting robot 21 and the aligner 22 are arranged, as described above, as a mechanism for taking out the semiconductor wafer, charged into the hermetically sealed vessel 4 and transported in this state, from the vessel, 4 to set the semiconductor wafer thus taken out on the inspection stage 11. These devices are connected to the control computer 31 through a robot control interface 31b. The elevator 20, transporting robot 21 and the aligner 22 are fed with a control signal from the control computer 31 through the robot control interface 31b.

That is, in taking out the semiconductor wafer, charged into the hermetically sealed vessel 4 and transported in this state, from the vessel 4, and in setting the semiconductor wafer thus taken out on the inspection stage 11, the control signal is sent from the control computer 31 through the robot control interface 31b to the elevator 20, transporting robot 21 and the aligner 22. Based on this control signal, the elevator 20, transporting robot 21 and the aligner 22 take out the semiconductor wafer, transported in the hermetically sealed vessel 4, from the vessel 4, to the semiconductor wafer on the inspection stage 11.

Inside the clean unit 2 of the inspection device 1 is arranged the anti-vibration base 10, on which are installed the inspection stage 11 including the X-stage 14, Y-stage 15, θ-stage 16, Z-stage 17 and the suction plate 18.

It is noted that the X-stage 14, Y-stage 15, θ-stage 16, Z-stage 17 and the suction plate 18 are connected through a stage control interface 31c to the control computer 31 provided in the external unit 5. The X-stage 14, Y-stage 15, θ-stage 16, Z-stage 17 and the suction plate 18 are fed with control signals from the control computer 31 through the stage control interface 31c.

In inspecting the semiconductor wafer, control signals are issued from the control computer 31 through the stage control interface 31c to the X-stage 14, Y-stage 15, θ-stage 16, Z-stage 17 and the suction plate 18. Based on the control signals, the X-stage 14, Y-stage 15, θ-stage 16, Z-stage 17 and the suction plate 18 are actuated to suck and secure the semiconductor wafer being inspected by the suction plate 18, whilst the X-stage 14, Y-stage 15, θ-stage 16 and the Z-stage 17 are actuated so that the semiconductor wafer will be of a pre-set position, a pre-set angle and a pre-set height.

On the anti-vibration base 10 is mounted the optical unit 12 which serves for imaging the semiconductor wafer in inspecting the semiconductor wafer and which has both the function of photographing the image of the semiconductor wafer being inspected with a low resolution using the visible light and the function of photographing the image of the semiconductor wafer being inspected with a high resolution using the UV light.

Within this optical unit 12 are arranged, as a mechanism for photographing an image of the semiconductor wafer with visible light, a CCD camera for visible light 32, a halogen lamp 34, an optical system for visible light 35, an objective lens for visible light 36 and an auto-focussing unit for visible light 37.

In photographing the image of the semiconductor wafer with the visible light, the halogen lamp 34 is turned on. It is noted that the halogen lamp 34 has its operating source connected through a light source control interface 31d to the control computer 31 arranged in the external unit 5. The operating source of the halogen lamp 34 is fed with a control signal through a light source control interface 31d from the control computer 31. The halogen lamp 34 is turned on and off based on this control signal.

For photographing the image of the semiconductor wafer with the visible light, the halogen lamp 34 is turned on so that the visible light therefrom is illuminated on the semiconductor wafer through the optical system for visible light 35 and the objective lens for visible light 36 on the semiconductor wafer to illuminate the latter. The image of the semiconductor wafer, thus illuminated by the visible light, is enlarged by the objective lens for visible light 36, with the enlarged image being then photographed by the CCD camera for visible light 32.

It is noted that the CCD camera for visible light 32 is connected through an image retrieving interface 30b to the image-processing computer 30 arranged in the external unit 5. The image of the semiconductor wafer, photographed by the CCD camera for visible light 32, is retrieved by the image-processing computer 30 through the image retrieving interface 30b.

In photographing the image of the semiconductor wafer with the visible light, as described above, an auto-focussing operation is carried out under control by the auto-focussing unit for visible light 37. Specifically, the auto-focussing unit for visible light 37 detects whether or not the separation between the objective lens for visible light 36 and the semiconductor wafer coincides with the focal length of the objective lens for visible light 36. When they do not coincide, the objective lens for visible light 36 or the Z-stage 17 is moved to bring the plane of inspection of the seimconductor wafer into coincidence with the focal plane of the objective lens for visible light 36.

It is noted that the auto-focussing unit for visible light 37 is connected to the control computer 31 arranged in the external unit 5 through an auto-focussing control interface 31e. The auto-focussing unit for visible light 37 is fed with a control signal from the control computer 31 through the auto-focussing control interface 31e. The auto-focussing of the objective lens for visible light 36 under control by the auto-focussing unit for visible light 37 takes place based on this control signal.

Inside the optical unit 12 are arranged a CCD camera for UV light 33, a laser light source for UV light 38, an optical system for UV light 39, an objective lens for UV light 40 and a distance sensor 41, consisting a mechanism for photographing the image of the semiconductor wafer with the UV light.

In photographing an image of the semiconductor wafer with the UV light, the laser light source for UV light 38 is turned on. It is noted that the operating source of the laser light source for UV light 38 is connected through the light source control interface 31d to the control computer 31 arranged in the external unit 5. The operating source of the laser light source for UV light 38 is fed with the control signal from the control computer 31 through the light source control interface 31d. The laser light source for UV light 38 is turned on and off based on this control signal.

The upper limit wavelength of the UV solid laser, usable for practical industrial application, is 355 nm. Desirably, such a light source radiating the UV laser light with the wavelength not longer than 355 nm is used as the laser light source for UV light 38. The UV laser light with the wavelength of 355 nm is obtained as a tripled wave of the YAG laser. It is possible to obtain the UV laser light with the wavelength of 266 nm as a quadrupled wave of the YAG laser. As a laser light source, a type with an oscillation wavelength of 166 nm has also been conventionally developed. This laser light source may also be used as the laser light source for UV light 38. It is noted that, for improving the resolution, the UV laser light, radiated from the laser light source for UV light 38, is desirably of a shorter wavelength. However, if the wavelength is too short, it is difficult to realize an optical system matched to the wavelength. Therefore, the wavelength $\lambda$ of the UV laser radiated from the laser light source for UV light 38 is desirably of the order of 355 to 166 nm.

In photographing an image of the semiconductor wafer with the UV light, the laser light source for UV light 38 is turned on, and the UV light from the laser light source for UV light 38 is illuminated on the semiconductor wafer through the optical system for UV light 39 and the objective lens for UV light 40 to illuminate the semiconductor wafer. The image of the semiconductor wafer, illuminated by the UV light, is enlarged by the objective lens for UV light 40, and the resulting enlarged image is photographed by the CCD camera for UV light 33.

It is noted that the CCD camera for UV light 33 is connected through an image retrieving interface 30c to the image-processing computer 30 arranged in the external unit 5. The image of the semiconductor wafer, photographed by the CCD camera for UV light 33, is retrieved through the image retrieving interface 30c by the image-processing computer 30.

In photographing the image of the semiconductor wafer by the UV light as described above, the auto-focussing operation of the objective lens for UV light 40 is carried out using the distance sensor 41. That is, the separation between the objective lens for UV light 40 and the semiconductor wafer is detected by the distance sensor 41, and the objective lens for UV light 40 or the Z-stage 17 is moved, based on the result of detection, so that the plane of inspection of the semiconductor wafer coincides with the focal plane of the objective lens for UV light 40.

The distance sensor 41 is connected through a sensor interface 31f to the control computer 31 provided in the external unit 5. The distance sensor 41 is fed with a control signal from the control computer 31 through the sensor interface 31f. The distance sensor 41 uses this control signal to detect the distance to the semiconductor wafer to send the detected result through the sensor interface 31f to the control computer 31. Based on the distance detected by the distance sensor 41, the control computer 31 causes movement of the X-stage 14, Y-stage 15 and the Z-stage 17 to effect auto-focussing of the objective lens for UV light 40.

As this distance sensor 41, a capacitance type sensor, for example, is used. The capacitance type sensor measures the capacitance between itself and an article being measured to measure the distance between the sensor and the article being measured without contacting the article being measured. When the capacitance type sensor is used as the distance sensor 41, the full measurement scale is e.g., ±10V/±100 μm.

Figure 5:
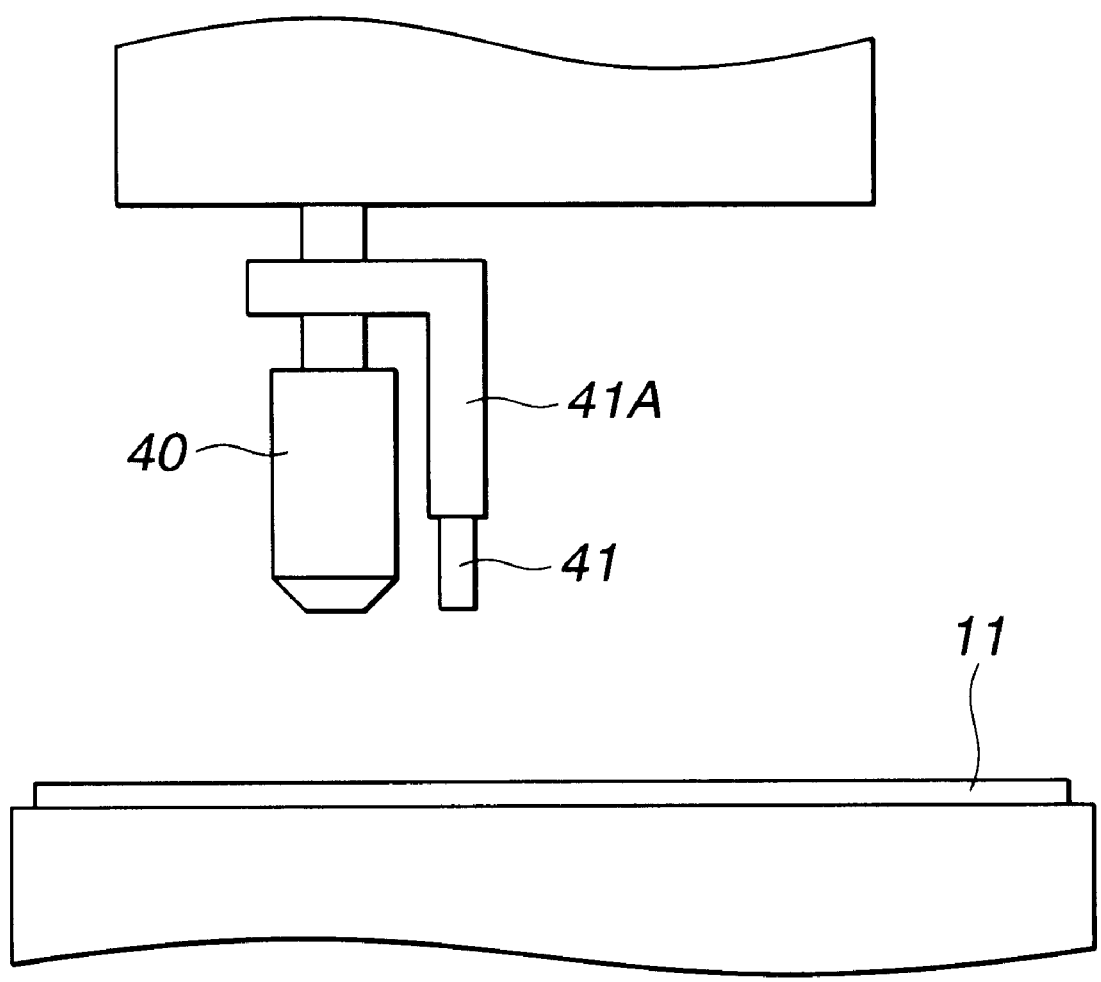
FIG. 5 shows an illustrative structure of a distance sensor and an objective lens for UV light.

The distance sensor 41 is mounted within the optical unit 12 at a fixed relative position to the objective lens for UV light 40. For example, the distance sensor 41 is secured to the objective lens for UV light 40 through a connecting member 41A at a substantially equal height level (perpendicular position) to that of the objective lens for UV light 40, as shown in FIG. 5. This distance sensor 41 detects the distance in the light radiating direction of the UV light illuminated on the semiconductor wafer through the objective lens for UV light 40. That is, the distance sensor 41 detects the distance in the perpendicular direction between the distance sensor 41 and the semiconductor wafer.

The optical system of the optical unit 12 of the inspection device 1 is explained in further detail with reference to FIG. 6. Meanwhile, the explanation on the auto-focussing controllers 37, 41 is omitted and the explanation is made of the optical system illuminating the semiconductor wafer being inspected and the optical system for imaging the semiconductor wafer being inspected.

Figure 6:
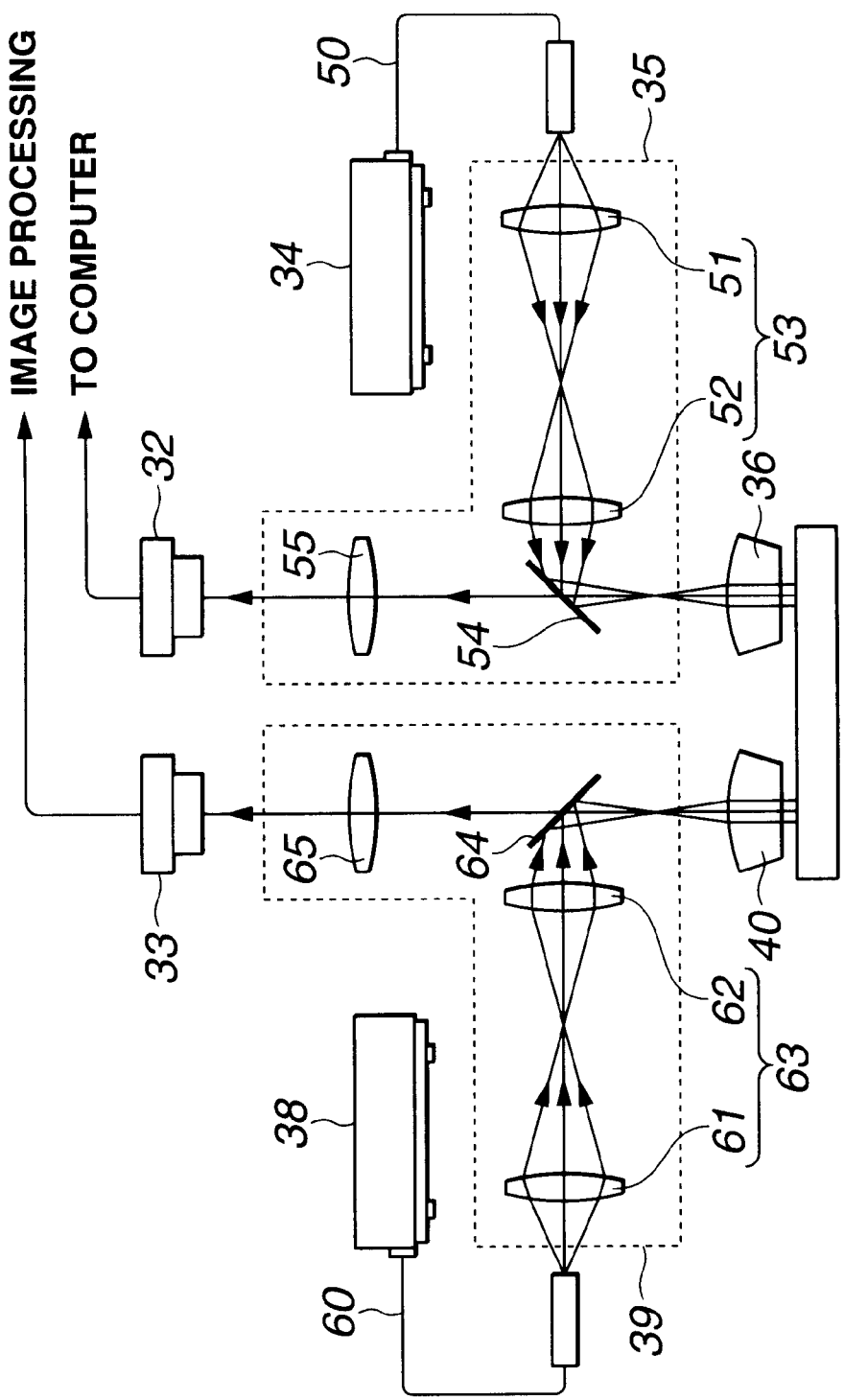
FIG. 6 shows an illustrative structure of an optical system of an optical unit of the inspection device shown in FIG. 1.

Referring to FIG. 6, the optical unit 12 includes, as an optical system for photographing an image of the semiconductor wafer by the visible light, the halogen lamp 34, optical system for visible light 35 and the objective lens for visible light 36.

The visible light from the halogen lamp 34 is forwarded by an optical fiber 50 to the optical system for visible light 35. It is noted that the optical system for visible light 35 includes an illuminating optical system 53, made up of lenses 51, 52, with the visible light forwarded by the optical fiber 50 to the optical system for visible light 35 first falling on the illuminating optical system 53. The visible light, forwarded by the optical fiber to the optical system for visible light 35, falls on the half mirror 54 and is reflected thereby towards the objective lens for visible light 36 so as to fall on the semiconductor wafer through the objective lens for visible light 36. This illuminates the semiconductor wafer with the visible light.

The image of the semiconductor wafer, illuminated by the visible light, is enlarged by the objective lens for visible light 36 and photographed by the CCD camera for visible light 32. That is, the reflected light from the semiconductor wafer, illuminated by the visible light, falls on the CCD camera for visible light 32 through the objective lens for visible light 36, a half mirror 54 and an imaging lens 55, whereby an enlarged image of the semiconductor wafer is photographed by the CCD camera for visible light 32. The image of the semiconductor wafer, photographed by the CCD camera for visible light 32, referred to below as the visible image, is sent to the image-processing computer 30.

The optical unit 12 includes, as an optical system for photographing an image of the semiconductor wafer with UV light, the laser light source for UV light 38, optical system for UV light 39 and the objective lens for UV light 40.

The UV light from the laser light source for UV light 38 is forwarded by an optical fiber 60 to the optical system for UV light 39. The optical system for UV light 39 includes an optical system for illumination 63, constructed by the two lenses 61, 62. The UV light, forwarded by the optical fiber 60 to the optical system for UV light 39, first falls on the optical system for illumination 63. The UV light, forwarded by the optical fiber 60 to the optical system for UV light 39, is incident on a half mirror 64 through the optical system for illumination 63 and thereby reflected by the half mirror 64 towards the objective lens for UV light 40 to fall therethrough on the semiconductor wafer to illuminate the latter with the UV light.

The image of the semiconductor wafer, illuminated by the UV light, is enlarged by the objective lens for UV light 40 and photographed by the CCD camera for UV light 33. That is, the reflected light from the semiconductor wafer, illuminated by the UV light, falls on the CCD camera for UV light 33 through the objective lens for UV light 40, half mirror 64 and an imaging lens 65, whereby the enlarged image of the semiconductor wafer is photographed by the CCD camera for UV light 33. The image of the semiconductor wafer, photographed by the CCD camera for UV light 33 (referred to below as UV image) is sent to the image-processing computer 30.

Figure 7:
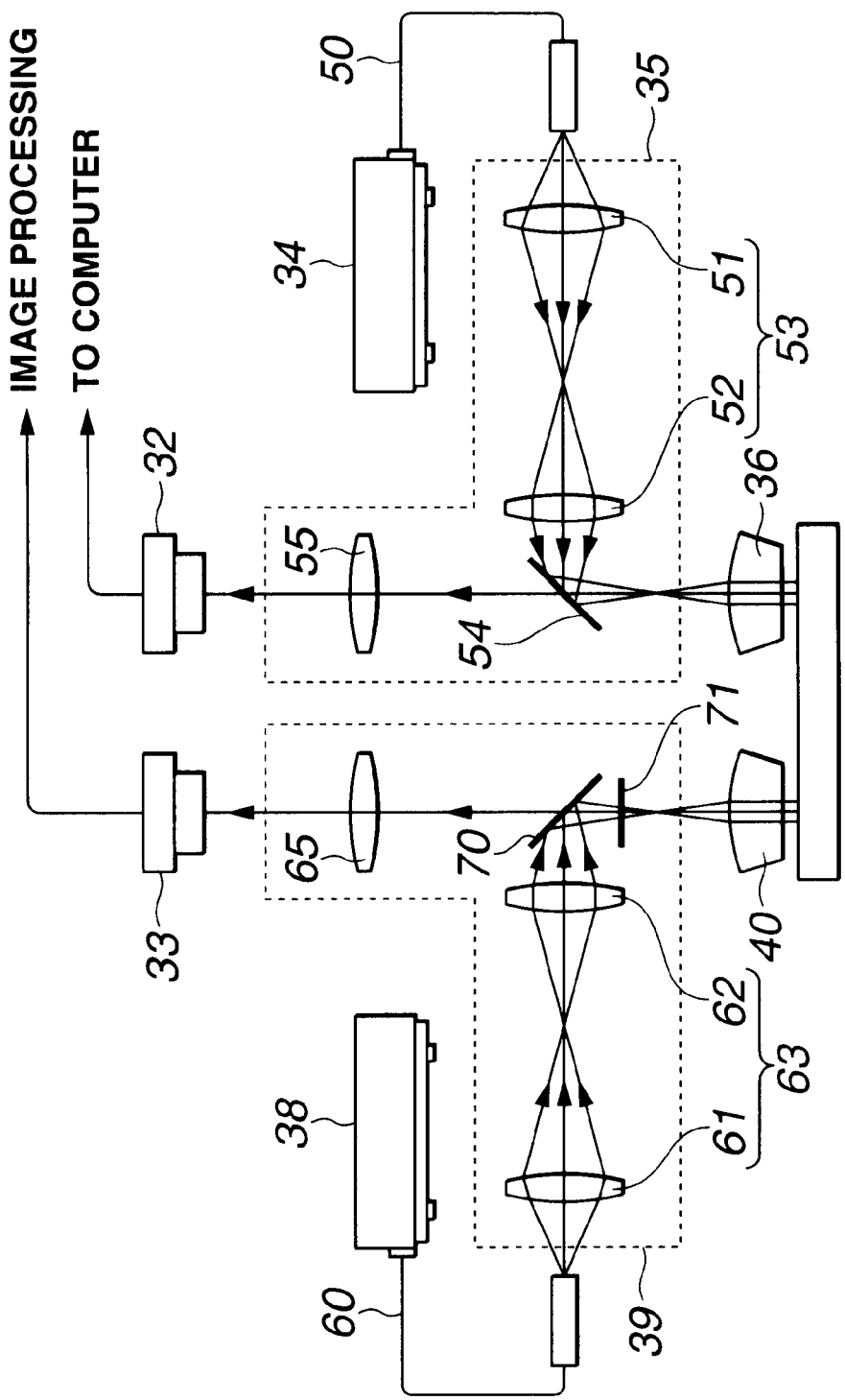
FIG. 7 shows another illustrative structure of an optical system of an optical unit of the inspection device shown in FIG. 1.

In the optical system for UV light 39, a polarizing beam splitter 70 may be provided in place of the half mirror 64, and a quarter wave plate 71 may be provided between the polarizing beam splitter 70 and the objective lens for UV light 40, as shown in FIG. 7. By employing this structure, the UV laser can be used efficiently.

In the above-described inspection device 1, in which the image of the semiconductor wafer can be photographed and inspected by the UV light which is the light of a shorter wavelength than the visible light, it is possible to detect or classify finer defects than if the visible light is used to perform defect detection or classification.

Moreover, in the inspection device 1, provided with both the optical system for visible light and with that for UV light, it is possible to effect the semiconductor wafer inspection with a low resolution using the visible light and that with a high resolution using the UV light. Therefore, with the inspection device 1, it is possible to detect or classify larger defects by the semiconductor wafer inspection at lower resolution employing the visible light as well as to detect or classify finer defects by the semiconductor wafer inspection at higher resolution employing the UV light.

In the above-described inspection device 1, a larger numerical aperture NA of the objective lens for UV light 40 is desirable. For example, it is set to 0.9 or higher. By employing a lens with a higher numerical aperture NA as the objective lens for UV light 40, it is possible to detect finer defects.

If the semiconductor wafer defect is made up only of micro-irregularities, such as a graze, and is devoid of the color information, such defect is hardly perceptible with the incoherent light. If conversely the light with high coherency, such as laser light, even the defect made up only of micro-irregularities, and devoid of the color information, can be viewed clearly because the light undergoes interference in the vicinity of a step difference of the micro-irregularities. The inspection device 1 uses the laser light source for UV light 38, radiating the laser light of the ultraviolet range, as the UV light source. Therefore, in the inspection device 1, the defect made up only of micro-irregularities and which is devoid of the color information, such as a graze, can be detected clearly. That is, with the above-described inspection device 1, the phase information, difficult to locate with the visible light (incoherent light) from the halogen lamp 34, can be detected easily using the UV laser light (coherent light) from the laser light source for UV light 38.

Figure 8:
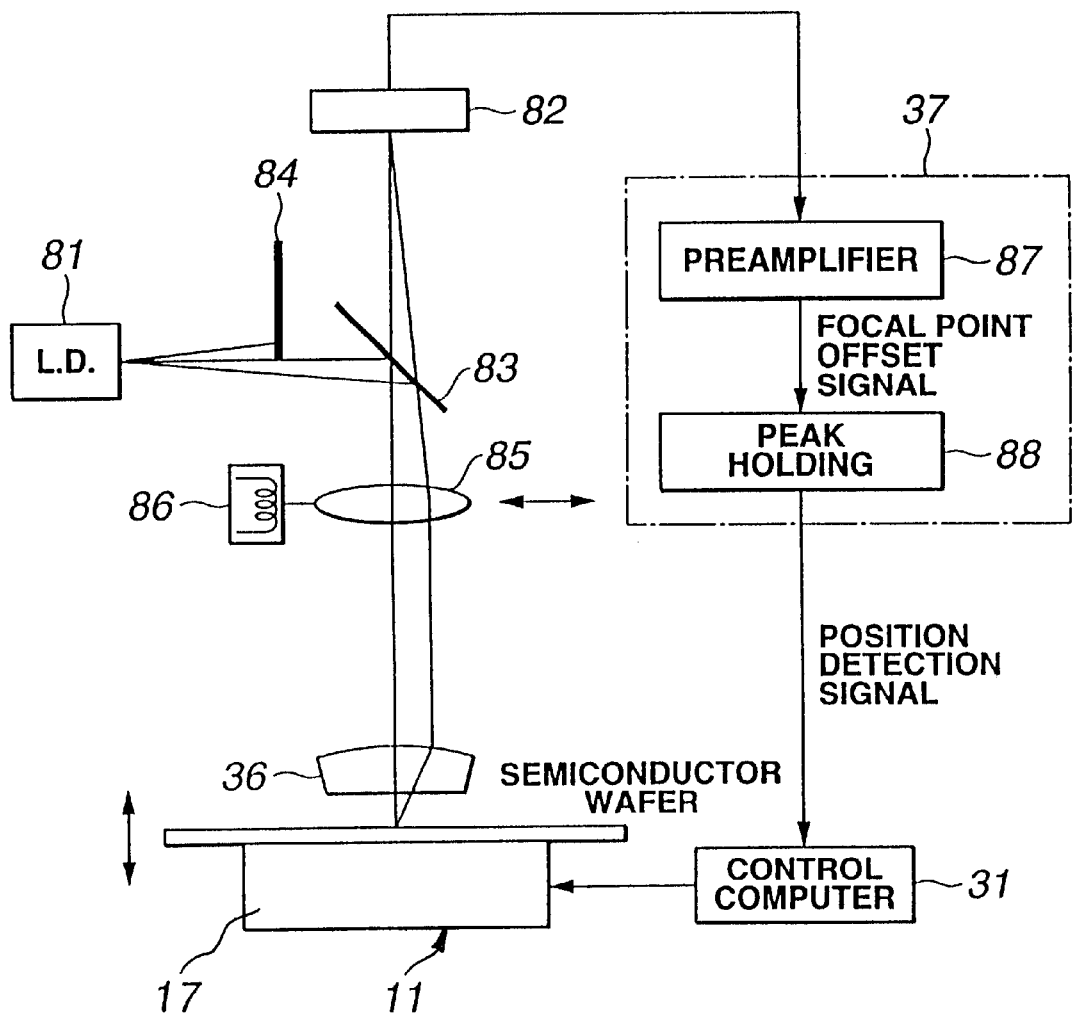
FIG. 8 shows an illustrative structure of an auto-focussing control unit for visible light of the inspection device shown in FIG. 1 and of an optical system for auto-focussing of the visible light in the optical unit.

Referring to FIG. 8, showing an optical system the auto-focussing unit for visible light 37 for visible light and the optical system for auto-focussing of the visible light in the optical unit 12, the auto-focussing operation for the objective lens for visible light 36 is explained. Here, the explanation of the optical system for illuminating the semiconductor wafer being inspected and of the optical system for imaging the semiconductor wafer being inspected is omitted, that is the explanation of the optical system shown in FIG. 6 is omitted, such that only the optical system required for auto-focussing the objective lens for visible light 36 in the optical unit 12 is shown in FIG. 8. However, as a matter of course, the optical system necessary for auto-focussing is provided within the optical unit 12 to preclude mechanical interference with the illuminating and imaging optical system for the semiconductor wafer.

Referring to FIG. 8, the optical unit 12 includes, as the optical system for auto-focussing the visible light, the objective lens for visible light 36, a laser diode 81 for radiating the laser light, and a photodetector 82 for receiving the laser light reflected back from the semiconductor wafer. The optical unit 12 also includes a half mirror 83, for splitting the optical path of the light radiated from the laser diode 81 from that of the reflected light from the semiconductor wafer, a knife edge 84 provided between the laser diode 81 and the half mirror 83, and a collimator lens 85 provided between the half mirror 83 and the objective lens for visible light 36.

The optical unit 12 is provided with a voice coil motor 86 for oscillating the collimator lens 85 in a direction parallel to the disc-shaped semiconductor wafer.

The auto-focussing unit for visible light 37 includes a pre-amplifier 87 and a peak-holding circuit 88.

On the inspection stage 11 is set a disc-shaped semiconductor wafer to be inspected. This inspection stage 11 has its Z-stage 17 moved under control by the control computer 31 to cause movement of the semiconductor wafer set thereon in the height-wise direction.

The laser diode 81 radiates the laser light of the visible light. The laser light radiated from the laser diode 81 has its spot shape changed to a semi-circular shape by the knife edge 84 to fall on the half mirror 83. The half mirror 83 reflects the laser light illuminated from the laser diode 81. The laser light reflected back from the half mirror 83 is collimated by the collimator lens 85 into parallel light which then is incident on the objective lens for visible light 36. The objective lens for visible light 36 converges the collimated laser light to illuminate the converged laser light on the semiconductor wafer.

The laser spot formed on the semiconductor wafer is semi-circular in shape, because of the provision of the knife edge 84, and has its center-of-gravity position shifted linearly responsive to the amount of shift of the focal point position.

The collimator lens 85 is carried by the voice coil motor 86 which oscillates the collimator lens 85 at a pre-set period and at a pre-set amplitude in a direction parallel to the disc-shaped semiconductor wafer.

The laser light, converged by the objective lens for visible light 36, is reflected by the semiconductor wafer, and is passed through the objective lens for visible light 36 and the collimator lens 85 to fall on the half mirror 83, through which the reflected light from the semiconductor wafer is now transmitted. The reflected light, transmitted through the half mirror 83, is illuminated on the photodetector 82.

The photodetector 82 is covalent in its arraying position with respect to the laser diode 81. The photodetector 82 receives the reflected light from the semiconductor wafer and converts it into electrical signals proportionate to the received light volume to route the electrical signals to the pre-amplifier 87. Similarly to the laser spot formed on the semiconductor wafer, the laser spot formed on the photo-detector 82 has its center-of-gravity position shifted linearly in proportion to the amount of shift of the focal point position. The photodetector 82 has its light detection area split into plural portions to permit detection of the center-of-gravity position of the received laser spot.

The pre-amplifier 87 of the auto-focussing unit for visible light 37 finds the center of gravity of the laser spot formed on the photodetector 82, from the electrical signals sent from the photodetector 82, to generate a focal point offset signal, indicating the deviation from the focal point of the laser spot formed on the semiconductor wafer.

The peak-holding circuit 88 of the auto-focussing unit for visible light 37 holds peak values of the focal point offset signal outputted by the pre-amplifier 87, to generate a distance detection signal indicating the distance between the semiconductor wafer and the objective lens for visible light 36.

The control computer 31 acquires the distance detection signal from the auto-focussing unit for visible light 37 through the auto-focussing control interface 31e. From this distance detection signal, the control computer 31 finds the distance between the objective lens for visible light 36 and the semiconductor wafer and causes movement of the Z-stage 17 so that this distance will be coincident with the focal length of the objective lens for visible light 36 to control the height position of the semiconductor wafer.

In this optical unit 12, the voice coil motor 86 causes horizontal oscillations of the collimator lens 85. So, the laser spot illuminated on the semiconductor wafer is oscillated in the horizontal direction on the semiconductor wafer. Suppose the focal length of the collimator lens 85 is 100 mm and that of the objective lens for visible light 36 is 2 mm. When the collimator lens 85 is oscillated under these conditions and with an amplitude of 1 mm, the laser spot is oscillated on the semiconductor wafer in a range of 1 mm×(2 mm/100 mm)=20 $\mu$m. The frequency of oscillations of the collimator lens 85 is set to e.g., 75 Hz to permit oscillations with a small current.

A case where the laser spot oscillating in the horizontal direction is illuminated on a semiconductor wafer comprising an inter-layer insulating film and metallic interconnections 92, deposited thereon, is explained below with reference to FIG. 9.

Figure 9A:
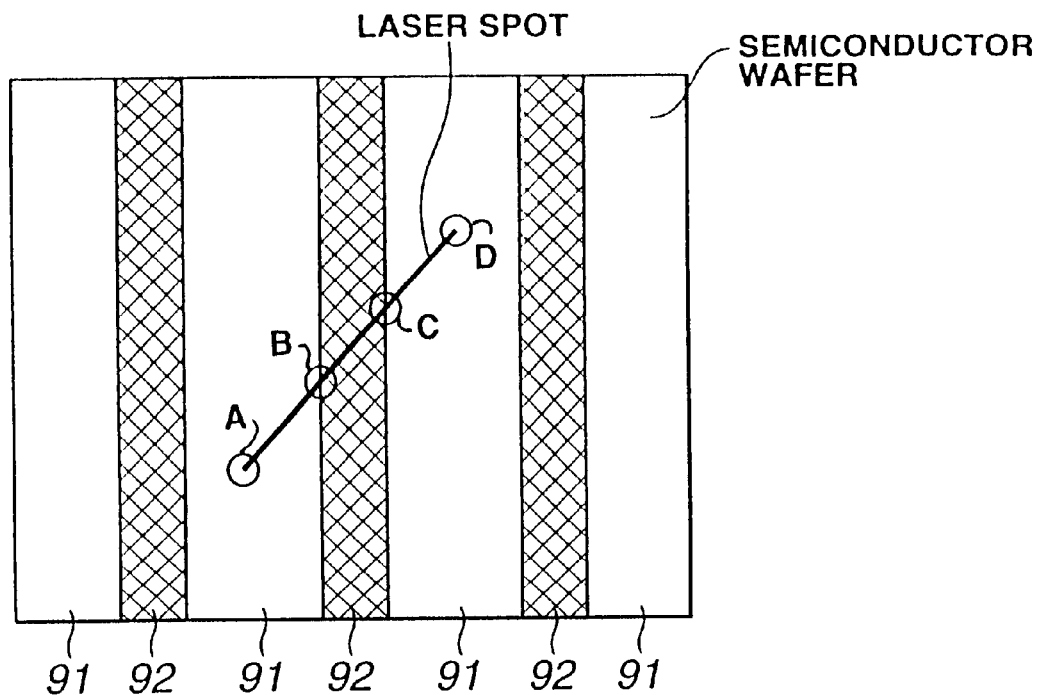
FIGS. 9A–9B illustrate the laser spot vibrating in the horizontal direction and which is illuminated on the semiconductor wafer having the metallic interconnection formed on the inter-layer insulating film.
Figure 9B:
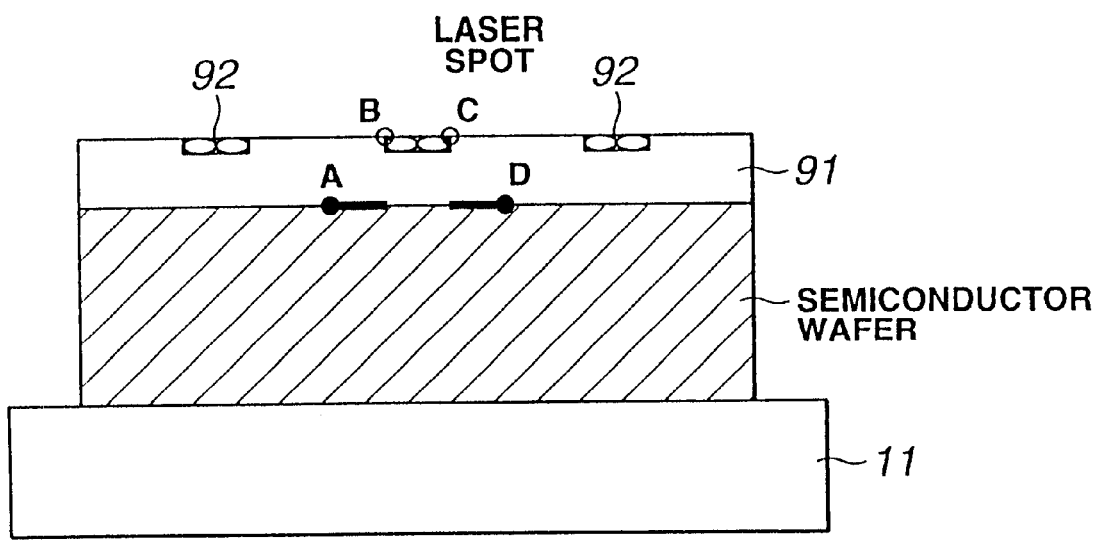
Figure 10:
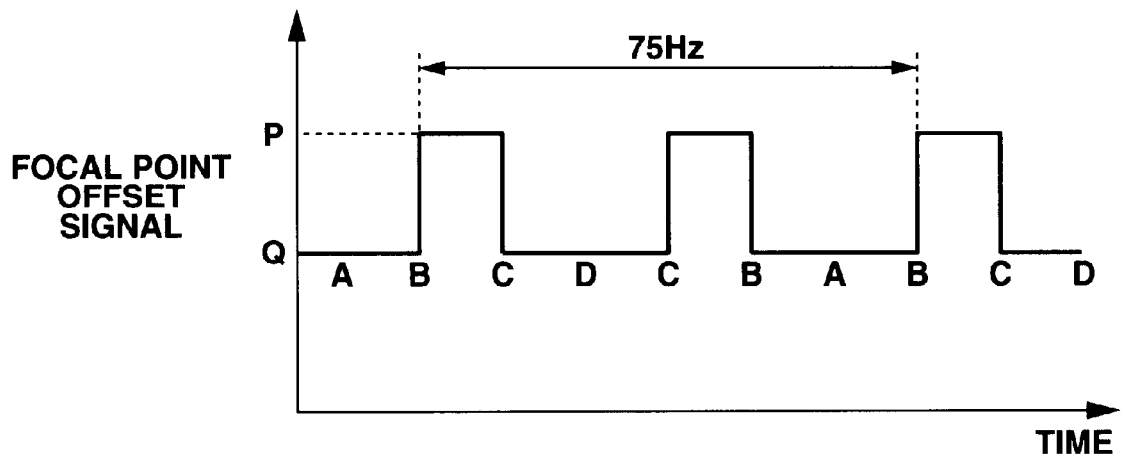
FIG. 10 illustrates a focussing deviation magnitude signal outputted from a pre-amplifier of the visible light auto-focussing control unit.

If the laser spot is oscillated in the horizontal direction across the metallic interconnections 92, it moves in a straight line on the semiconductor wafer, as shown in FIG. 9A. At this time, the laser light illuminated on the metallic interconnections 92 (indicated by a line interconnecting points B and C in FIG. 9A) is reflected by the semiconductor wafer surface, as shown in FIG. 9B. The laser light illuminated on the inter-layer insulating film 91, indicated by lines interconnecting the points A and B and the points C and D, shown in FIG. 9A, is not reflected by the semiconductor wafer surface, but is transmitted through the inter-layer insulating film 91 so as to be reflected by the underlying reflecting layer.

So, the focal point offset signal, outputted by the pre-amplifier 87, is a periodic pulse waveform signal having a high level on the metallic interconnections 92 and a low level on the inter-layer insulating film 91 and which is repeated at an oscillation period of the laser spot, as illuminated on the metallic interconnections 92, and that illuminated on the inter-layer insulating film 91, differ from each other in the height level of the site where reflection occurs, thus undergoing different amounts of offset from the focal point positions. The result is that the focal point offset signal differs in level on the metallic interconnections 92 and on the inter-layer insulating film 91.

Figure 11:
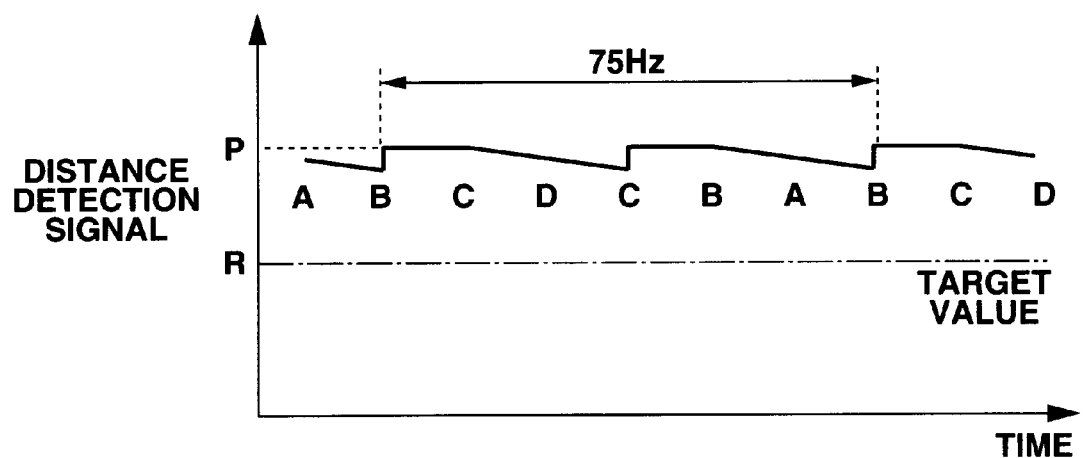
FIG. 11 illustrates a distance detection signal outputted from a peak holding circuit of the visible light auto-focussing controller.

The peak-holding circuit 88 performs peak holding processing on this focal point offset signal to generate a distance detection signal shown in FIG. 11. Since the peak-holding circuit 88 holds and outputs the peak values of the focal point offset signal, the distance component appearing in the distance detection signal is only the focal point offset signal of the laser spot on the metallic interconnections 92. That is, the distance signal outputted by the peak-holding circuit 88 is freed of the defocussing magnitude component of the laser spot on the inter-layer insulating film 91. Therefore, this distance detection signal is a signal indicating the distance form the metallic interconnections on the semiconductor wafer to the objective lens for visible light 36.

Figure 12:
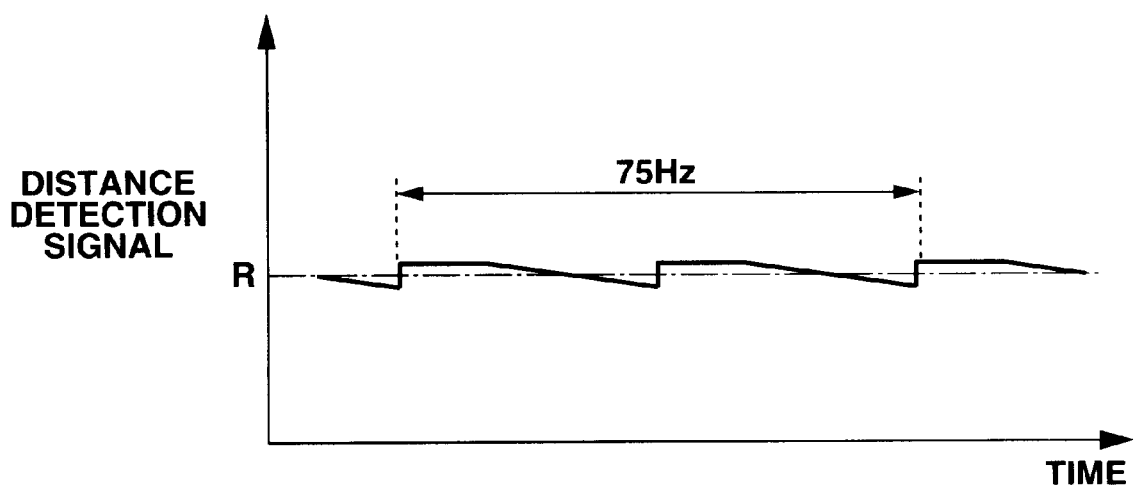
FIG. 12 illustrates the state in which distance detection signal outputted from the peak-holding circuit of the visible light auto-focussing controller is coincident with the target value.

Based on this distance detection signal, the control computer 31 drives the Z-stage 17 of the inspection stage 11 to manage control to bring this distance detection signal into coincidence with a target value R, as shown in FIG. 12.

In the inspection device 1 described above, it is possible to effect auto-focussing of the objective lens for visible light 36 on the metallic interconnections 92 formed on the inter-layer insulating film 91, that is, on the surface of the inter-layer insulating film 91, by oscillating the laser spot on the semiconductor wafer in the horizontal direction.

As means for oscillating the laser spot on the semiconductor wafer, a galvano-mirror, for example, may be used in place of the voice coil motor 86. However, the light converging position on the photodiode side needs to be adjusted accurately to assure a co-focal point condition for excluding the effect of offsetting of the light beam otherwise caused by laser spot oscillations.

In the above-described example, the peak-holding circuit 88 is used to hold the peak magnitude of the defocussing, with the use of the peak-holding circuit 88. However, there are occasions wherein, due to the difference in the circuit configuration such as the pre-amplifier 87, the metallic interconnections 92 may effect the bottom magnitude of the focal point offset signal. In such a case, the distance detection signal may be generated by employing a bottom-holding circuit in place of the peak-holding circuit 88.

Figure 13:
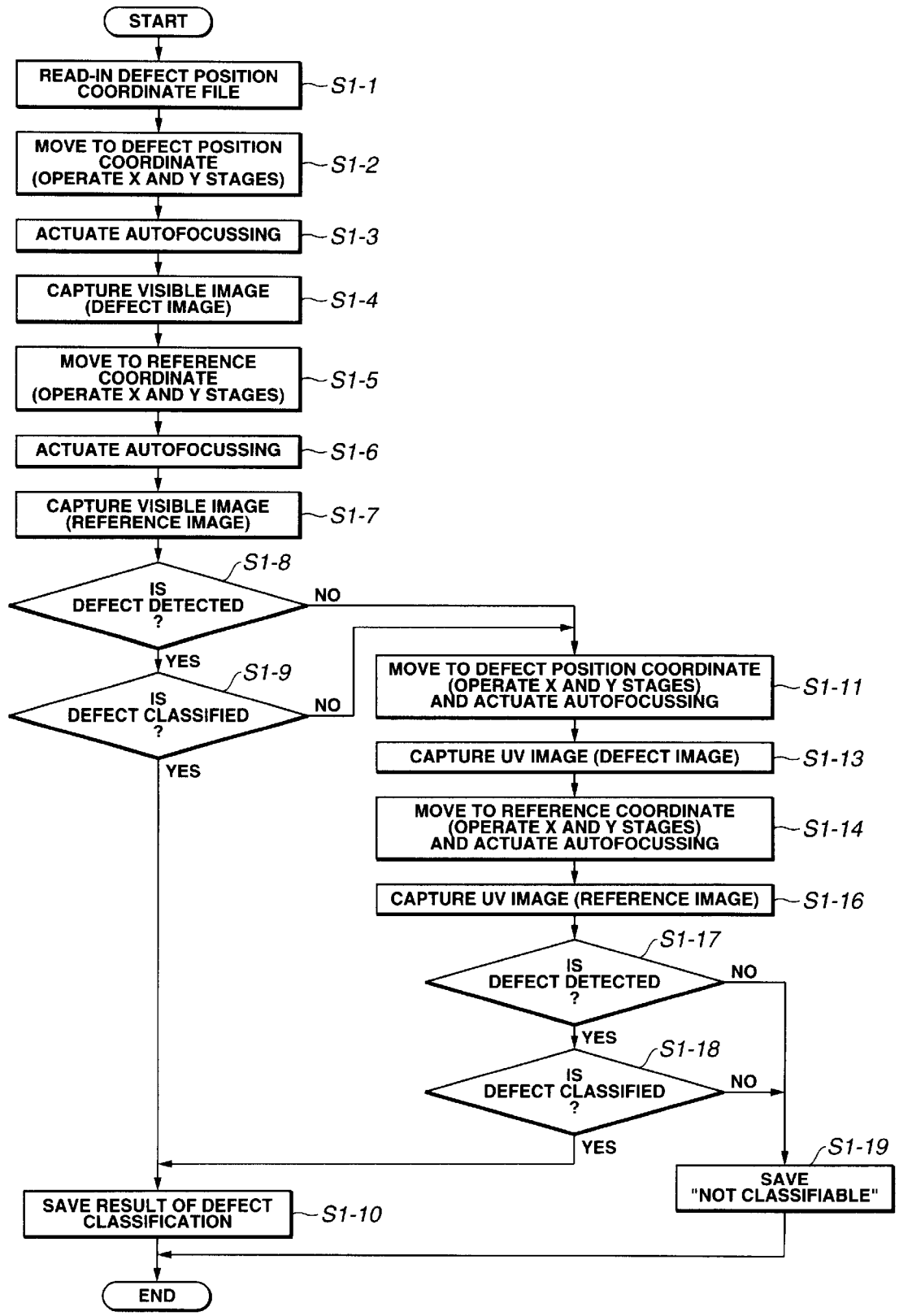
FIG. 13 is a flowchart showing an example of the operating sequence in inspecting the semiconductor wafer by the inspection apparatus according to the present invention.

The sequence of operations in inspecting the semiconductor wafer on the inspection device 1 is explained with reference to the flowchart of FIG. 13. The flowchart of FIG. 13 shows the processing downstream of the step in which the semiconductor wafer to be inspected is placed on the inspection stage 11. It is assumed here that a large number of similar device patterns are formed on the semiconductor wafer, and that defect detection or classification is performed by photographing the image of the defective area (defect image) and the image of the other area (reference image) and comparing these images to each other.

First, the sequence of operations in inspecting the semiconductor wafer is explained in accordance with the flowchart of FIG. 13. The flowchart of FIG. 13 shows a typical sequence of operations of inspecting the semiconductor wafer with the inspection device 1 and classifying the inspected defects in case the positions of the defects are known from the outset.

In this case, a defective position coordinate file is read into the control computer 31, as shown at step S1-1. It is noted that the defective position coordinate file is a file stating the information on the positions of defects on the semiconductor wafer and which is prepared by previously measuring the positions of the defects on the semiconductor wafer with e.g., a defect detection device. Here, the defective position coordinate file is read into the control computer 31.

Then, at step S1-2, the X-stage 14 and the Y-stage 15 are operated by the control computer 31 to shift the semiconductor wafer to the defect position coordinate indicated by the defective position coordinate file so that the area of the semiconductor wafer under inspection will be in the field of view of the objective lens for visible light 36.

Then, at step S1-3, the auto-focussing unit for visible light 37 is operated by the control computer 31 to effect auto-focussing of the objective lens for visible light 36.

Next, at step S1-4, an image of the semiconductor wafer is photographed by the CCD camera for visible light 32 and the visible image as photographed is forwarded to the image-processing computer 30. The visible image as photographed is an image at a defect position coordinate indicated by the defect position coordinate file, that is an image of the area where the defect is presumed to exist. This image is referred to below as a defect image.

Then, at step S1-5, the X-stage 14 and the Y-stage 15 are operated by the control computer 31 to shift the semiconductor wafer to the reference position coordinate so that the reference area of the semiconductor wafer will be in the field of view of the objective lens for visible light 36. It is noted that the reference area is an area of the semiconductor wafer other than the area to be inspected, that is an area in which a device pattern similar to the device pattern in the area under inspection of the semiconductor wafer.

Then, at step S1-6, the auto-focussing unit for visible light 37 is operated by the control computer 31 to effect auto-focussing of the objective lens for visible light 36.

Then, at step S1-7, an image of the semiconductor wafer is photographed by the CCD camera for visible light 32, and the visible image as photographed is routed to the image-processing computer 30. It is noted that the visible image as photographed here is an image of an area where there is formed a device pattern similar to the device pattern in the area under inspection of the semiconductor wafer. This image is referred to below as a reference image.

Next, at step S1-8, the defective image retrieved at step S1-4 is compared to the reference image retrieved at step S1-7 to find a defect from the defect image. If a defect is found, the processing transfers to step S1-9 and, if otherwise, the processing transfers to step S1-11.

At step S1-9, the image-processing computer 30 scrutinizes into the nature of the defect as found to proceed to classification. If defect classification has been completed, the processing transfers to step S1-10 and, if otherwise, the processing transfers to step S1-11.

At step S1-10, the results of classification of defects are saved. It is noted that the results of classification of defects are saved in a storage device connected to the image-processing computer 30 or to the control computer 31. Meanwhile, the results of classification of defects may also be transferred to and saved in another computer connected to the image-processing computer 30 or the control computer 31 over a network.

When the processing at step S1-10 ends, the classification of defects of the semiconductor wafer also ends, so the processing is terminated. However, if there is more than one defect on the semiconductor wafer, the program may revert to step S1-2 to detect and classify other defects.

If no defect has been found at step S108, or if the defect has not been classified at step S1-9, the processing transfers to step S1-11 to effect imaging at a higher resolution using UV light to find and classify the defects.

In such case, the X-stage 14 and the Y-stage 15 are operated at step S1 to S11 to shift the semiconductor wafer to the defect position coordinate indicated by the defect position coordinate file so that the area under inspection of the semiconductor wafer will be in the field of view of the objective lens for UV light 40. Simultaneously, the Z-stage 17 is shifted, based on the distance detected by the distance sensor 41, to effect auto-focussing at the defect position coordinate.

Then, at the step S1-13, an image of the semiconductor wafer is photographed by the CCD camera for UV light 33 to send the UV image as photographed to the image-processing computer 30. The UV image as photographed is an image in the defect position coordinate indicated by the defect position coordinate file. It is noted that the defect image is photographed using the UV light shorter in wavelength than the visible light and at a higher resolution than with the use of the visible light.

Then, at step S1-14, the X-stage 14 and the Y-stage 15 are operated to shift the semiconductor wafer to a reference position coordinate to cause the reference area of the semiconductor wafer to enter the field of view of the objective lens for UV light 40. On the other hand, the auto-focussing at this reference position coordinate is effected by operating the Z-stage 17 based on the distance as detected by the distance sensor 41.

The reference area is an area other than the area under inspection of the semiconductor wafer, and an area where there is formed a device pattern similar to the device pattern in the area under inspection of the semiconductor wafer.

Next, at step S1-15, an auto-focussing controller for UV light 41 is operated by the control computer 31 to effect auto-focussing of the objective lens for UV light 40.

Then, at step S1-16, an image of the semiconductor wafer is photographed by the CCD camera for UV light 33 to send the UV image as photographed to the image-processing computer 30. It is noted that the UV image photographed here is an image of an area of the semiconductor wafer where there is formed a device pattern similar to the device pattern in the area under inspection of the semiconductor wafer. That is, the UV image is the reference image. Here, the reference image is photographed using the UV light, shorter in wavelength than the visible light, at a higher resolution than in case of employing the visible light.

Next, at step S1-17, the defect image retrieved at step S1-13 is compared to the reference image retrieved at step S1-16, by the image-processing computer 30, to find the defect from the defect image. If a defect has been found, the processing transfers to step S1-18 and, if otherwise, the processing transfers to step S1-19.

At step S1-18, the image-processing computer 30 scrutinizes into the nature of the defect as detected to proceed to classification. If the defect has been classified, the processing transfers to step S1-10 to save the classified results of the defects. If the defect has not been classified, the processing transfers to step S1-19.

At step S1-19, the information indicating the effect of failure in the defect classification is saved. The information indicating the effect of failure in classifying the defects is saved e.g., in a storage device connected to the control computer 31 or the image-processing computer 30. This information may be transferred to and saved in a different computer connected over a network to the control computer 31 or the image-processing computer 30.

By the above-described procedure, the image photographed by the CCD camera for visible light 32 is processed and analyzed to inspect the semiconductor wafer at a low resolution. When the visible light failed to detect or classify the defects, an image photographed by the CCD camera for UV light 33 is processed and analyzed to inspect the semiconductor wafer at a higher resolution. By so doing, finer defects can be detected and classified than when using only the visible light.

However, if the visible light is used to effect imaging at a low resolution, the area that can be imaged at a time is wider. So, if the defect is large enough, it is preferable to inspect the semiconductor wafer using the visible light at low resolution for higher efficiency. Consequently, the semiconductor wafer can be inspected more efficiently by initially inspecting and classifying the defects, using the visible light, as discussed above, rather than detecting and classifying the defects using the UV light.

In the above-described inspection device 1, defects are found out from the reference image and the defect image photographed by the CCD cameras 32, 33. The technique of detecting the defects from the reference image and the defect image is hereinafter explained with reference to FIGS. 14A–E.

Figure 14:
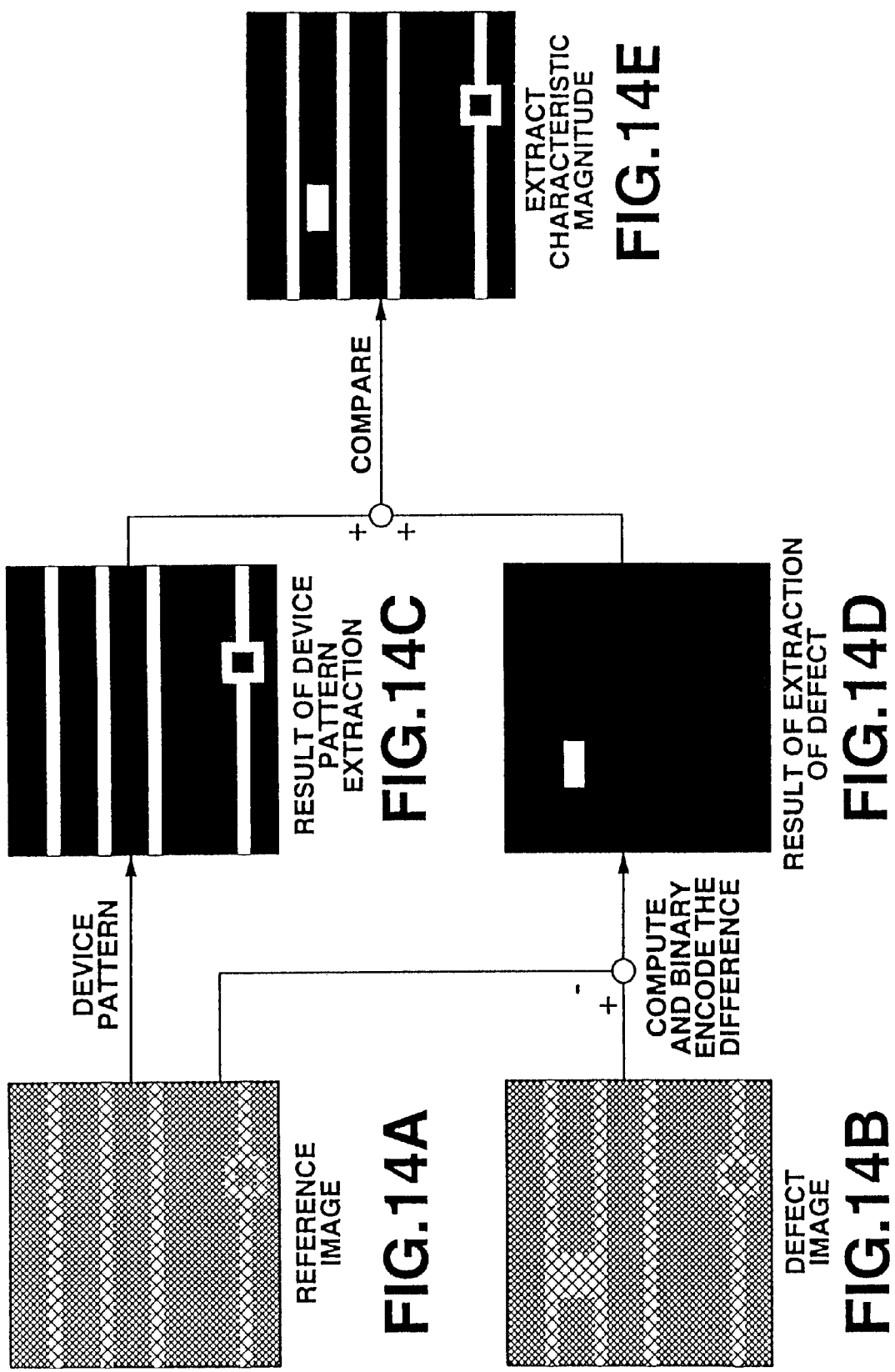
FIGS. 14A–14E illustrate the technique of defect detection from a reference image and a defective image.
Figure 15:
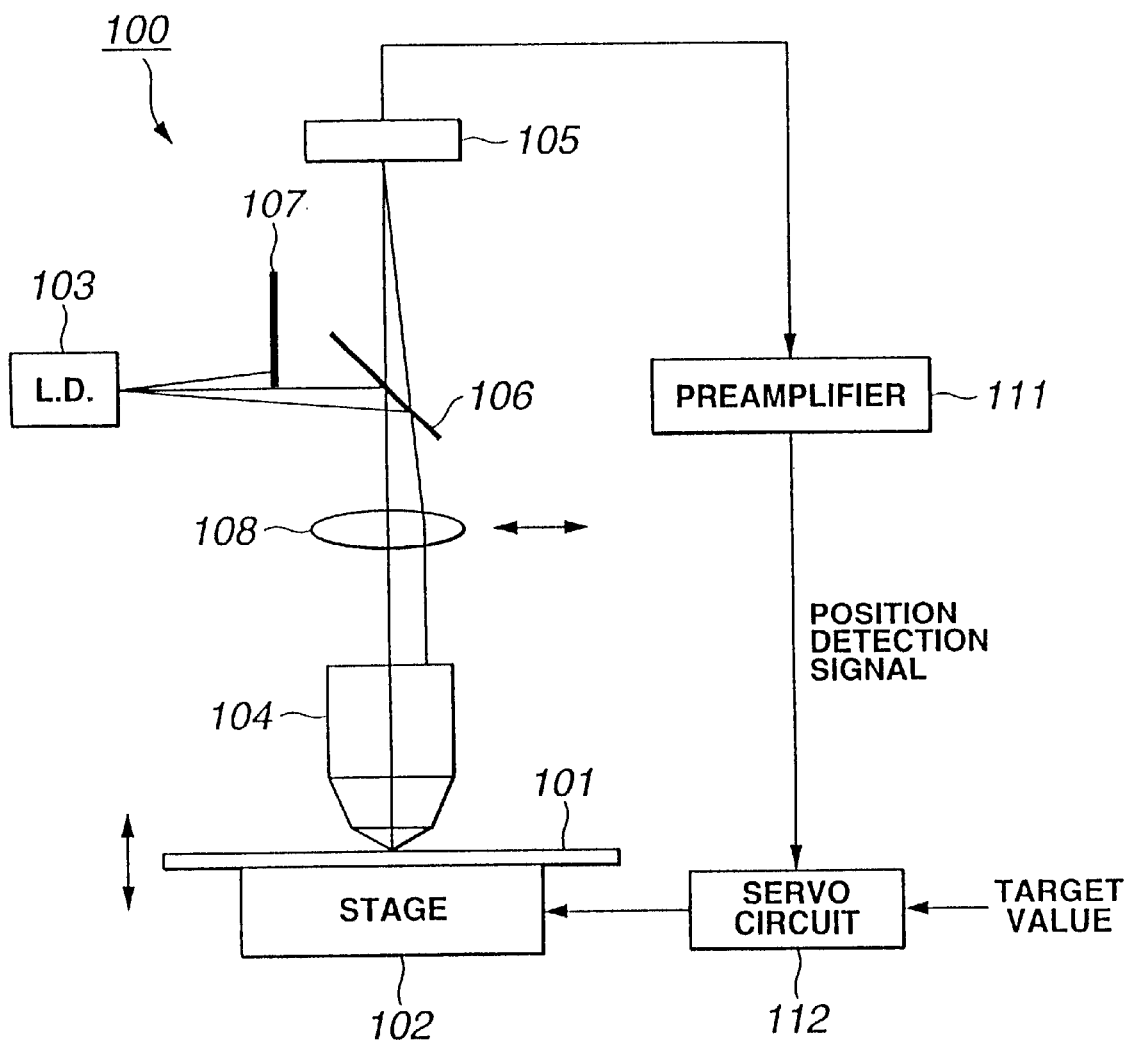
FIG. 15 shows an illustrative structure of the auto-focussing mechanism used in a conventional microscopic device for semiconductor inspection.
Figure 16:
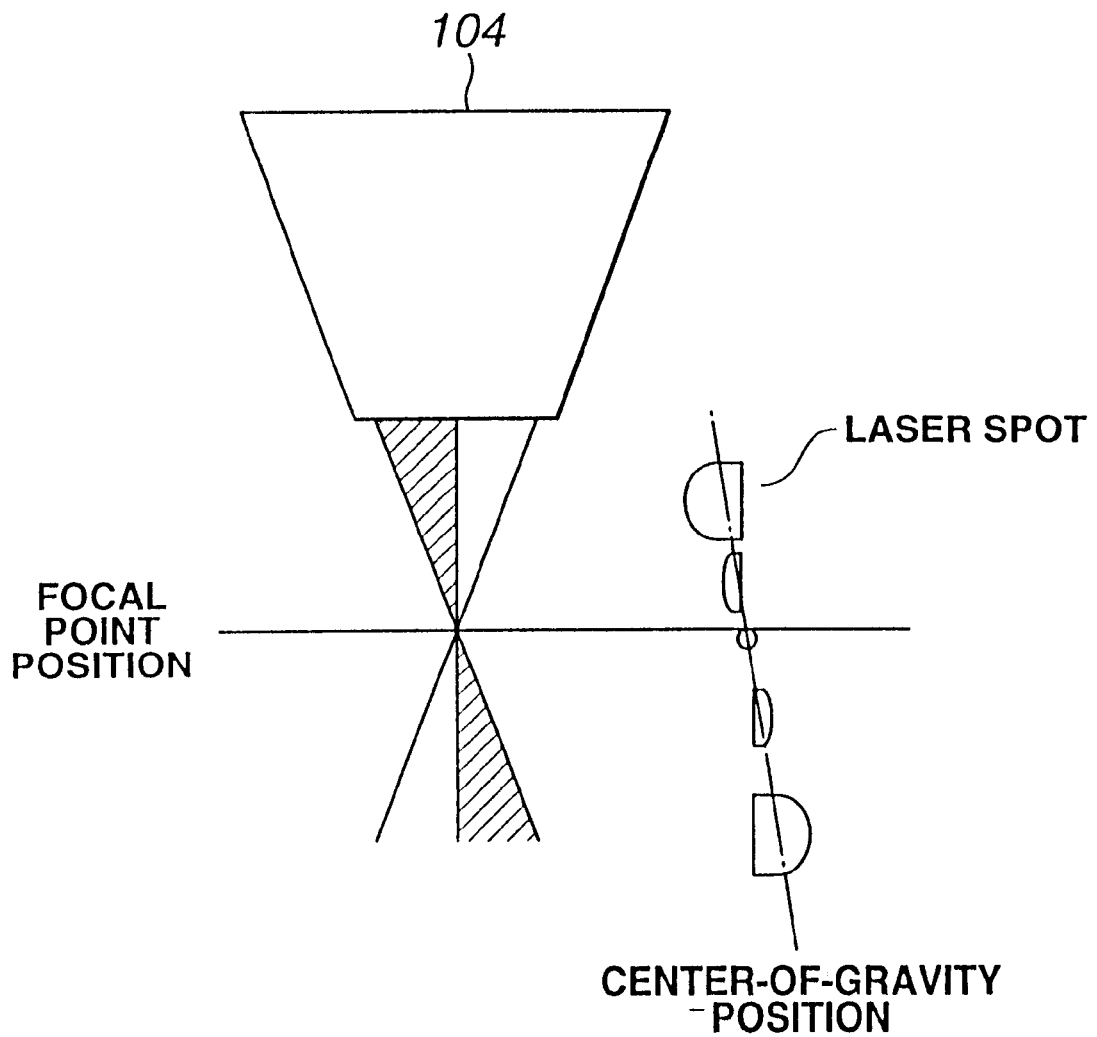
FIG. 16 illustrates a laser spot formed on a semiconductor wafer which becomes semi-circular under the effect of a knife edge.
Figure 17A:
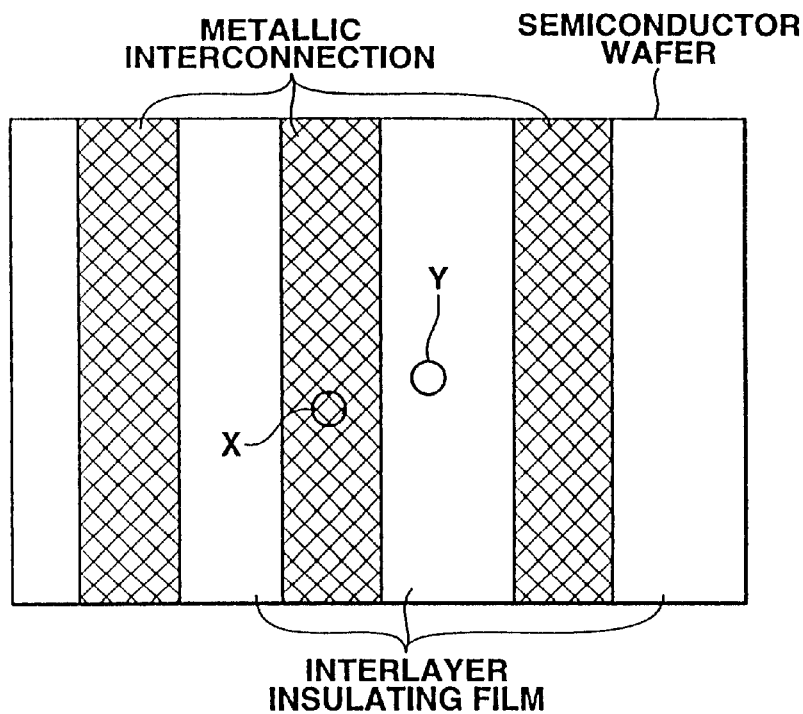
FIGS. 17A–17B illustrate the illuminating position of a laser spot formed on a semiconductor wafer comprising an inter-layer insulating film and a metallic interconnection.
Figure 17B:
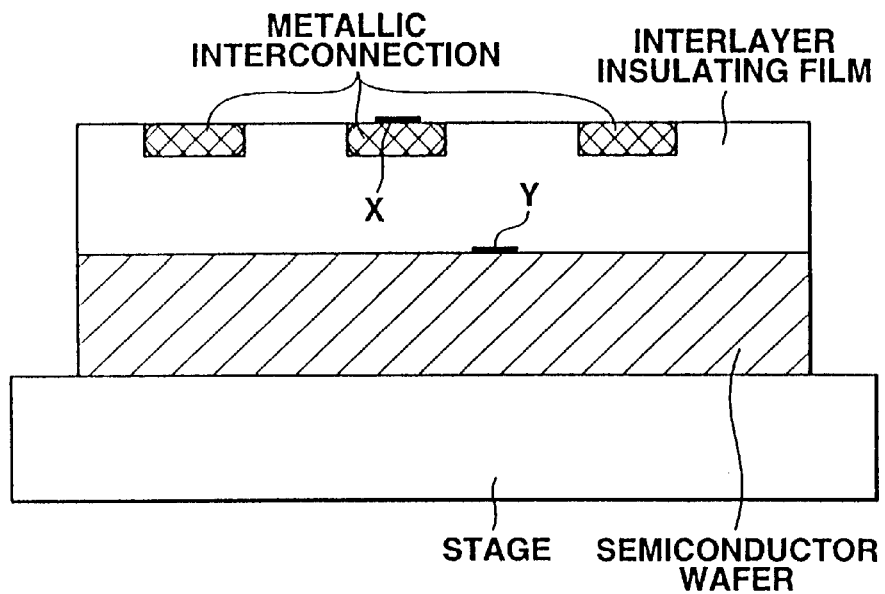

FIG. 14A shows an example of an image of a reference area in which there is formed a device pattern similar to one in the area under inspection, whereas FIG. 14B shows an example of an image of an area under inspection where a defect is presumed to exist, that is, a defect image.

In detecting the defect from the reference and defect images, a device pattern is extracted from the reference image, based on the color information and the gray scale information, as shown in FIG. 14C. Moreover, a differential image is found from the reference image and the defect image and a portion thereof with a larger difference is extracted as a defect, as shown in FIG. 14D.

Then, an image of the results of extraction of the device pattern shown in FIG. 14C and an image of the results of defect detection shown in FIG. 14D are superposed together to give an image to extract e.g., the proportion of the defects in the device pattern as a characteristic magnitude concerning the defect (see FIG. 14E).

In the inspection device 1, the reference image and the defect image, photographed by the CCD cameras 32, 33, are processed and analyzed by the image-processing computer 30 to detect the defect to inspect the semiconductor wafer.

In the foregoing explanation, it is assumed that the inspection device 1 according to the present invention is to be used for scrutinizing into the nature of the defect in the semiconductor wafer. However, the inspection device 1 according to the present invention can be used for other purposes than for identifying the defects in the semiconductor wafer. That is, the inspection device 1 of the present invention can be used for inspecting whether or not the device pattern formed on the semiconductor wafer has been formed to a proper shape which is in agreement with the desired pattern. Moreover, the inspection device 1 of the present invention is not limited to the inspection of the semiconductor wafer and can be broadly applied to the inspection of fine patterns. For example, the present invention can be used effectively for inspecting a flat panel display carrying a fine pattern.

What is claimed is:

1. A focal point position control mechanism comprising:

supporting means for supporting an object for illumination which is formed by a light-transmitting material and a light reflecting pattern formed thereon;

light illuminating means for illuminating light converged by an objective lens on said object of illumination supported by said supporting means;

distance detection means for detecting a distance between said light reflecting pattern and said objective lens, by forming a light spot on said object of illumination using said objective lens and by detecting reflected light from the light spot thus formed; and control means for controlling shifting of said at least one of supporting means and said objective lens according to the distance between said light reflecting pattern and the objective lens as detected by said distance detection means to bring the distance between said light reflecting pattern and the objective lens into coincidence with a focal length of said objective lens;

wherein said distance detection means causing the light spot formed on said object of illumination to be oscillated in a horizontal direction with respect to said object of illumination to detect each distance between a light reflecting layer on said object of illumination and the objective lens at each position along said horizontal direction, to distinguish said distance between said light reflecting pattern and the objective lens by comparing each said distance at each said position.

2. The focal point position control mechanism according to claim 1, wherein said distance detection means detects a defocussing magnitude of said light spot based on the reflected light of said light spot, said distance detection means detecting the distance between said light reflecting pattern and the objective lens from one of a peak value and a bottom value of said defocussing magnitude.

3. The focal point position control mechanism according to claim 2, wherein said distance detection means renders said light spot into a semicircular shape, using a knife edge, to detect the defocussing magnitude of said semicircular light spot.

4. The focal point position control mechanism according to claim 1, wherein said distance detection means causes oscillations of an optical component provided on an optical axis of the light forming said light spot to cause oscillations of said light spot.

5. The focal point position control mechanism according to claim 1, wherein said distance detection means causes oscillations of said light spot using a galvano-mirror.

6. A method for controlling a focal point position in which a focal point position of an objective lens adapted for illuminating light converged on an object of illumination formed by a light-transmitting material and a light reflecting pattern formed thereon is brought into coincidence with a position in which said reflective pattern is formed, the method comprising:

forming a light spot on said object of illumination using said objective lens;

causing oscillations of said light spot formed on said object of illumination in a horizontal direction relative to said object of illumination;

detecting reflected light from said light spot thus formed to detect each distance between a light reflecting layer on said object of illumination and the objective lens at each position along to said horizontal direction;

distinguishing a distance between said light reflecting pattern and the objective lens by comparing each said distance at each said position; and bringing the distance between said light reflecting pattern and the objective lens into coincidence with a focal length of said objective lens according to the distance between said light reflecting pattern and the objective lens as detected.

7. The focal point position control method according to claim 6, wherein a defocussing magnitude of said light spot is detected based on the reflected light of said light spot, and the distance between said light reflecting pattern and the objective lens is detected from one of a peak value and a bottom value of said defocussing magnitude.

8. The focal point position control method according to claim 7, wherein said light spot is rendered into a semicircular shape, using a knife edge, to detect the defocussing magnitude of said semicircular light spot.

9. The focal point position control method according to claim 6, wherein an optical component provided on an optical axis of the light forming said light spot is oscillated to cause oscillations of said light spot.

10. The focal point position control method according to claim 6, wherein said light spot is oscillated using a galvano-mirror.

11. An apparatus for inspecting a semiconductor wafer comprising:

supporting means for supporting a semiconductor wafer carrying a metallic interconnection;

means for illuminating light converged by an objective lens on the semiconductor wafer carried by said supporting means;

distance detection means for detecting a distance between said metallic interconnection and said objective lens, by forming a light spot on said object of illumination using said objective lens and by detecting reflected light from the light spot thus formed; and control means for controlling shifting of at least one of said supporting means and said objective lens according to the distance between said metallic interconnection and the objective lens as detected by said distance detection means for bringing the distance between said metallic interconnection and the objective lens into coincidence with a focal length of said objective lens;

photographing means for photographing an image of said semiconductor wafer by detecting the reflected light of the light illuminated by said light illuminating means on said semiconductor wafer; and inspection means for inspecting said semiconductor wafer by processing the image photographed by said photographing means;

wherein said distance detection means causing the light spot formed on said semiconductor wafer to be oscillated in a horizontal direction with respect to said semiconductor wafer to detect each distance between a light reflecting layer on semiconductor wafer and the objective lens at each position along said horizontal direction to distinguish said distance between said metallic interconnection and the objective lens by comparing each said distance at each said position.

12. The apparatus for inspecting a semiconductor wafer according to claim 11, wherein said distance detection means detects a defocussing magnitude of said light spot based on the reflected light of said light spot, said distance detection means detecting the distance between said metal interconnection and the objective lens from one of a peak value and a bottom value of said defocussing magnitude.

13. The apparatus for inspecting a semiconductor wafer according to claim 12, wherein said distance detection means renders said light spot into a semicircular shape, using a knife edge, to detect the defocussing magnitude of said semicircular light spot.

14. The apparatus for inspecting a semiconductor wafer according to claim 11, wherein said distance detection means causes oscillations of an optical component provided on an optical axis of the light forming said light spot to cause oscillations of said light spot.

15. The apparatus for inspecting a semiconductor wafer according to claim 11, wherein said distance detection means causes oscillations of said light spot using a galvano-mirror.

16. A method for inspecting a semiconductor wafer in which light converged by an objective lens is illuminated on the semiconductor wafer carrying a metallic interconnection and reflected light is detected to inspect the semiconductor wafer, the method comprising:

forming a light spot on the semiconductor wafer using said objective lens, oscillating the light spot formed on said semiconductor wafer relative to said semiconductor wafer;

detecting each distance between a light reflecting layer on the semiconductor wafer and the objective lens at each position along said horizontal direction by detecting the reflected light from the light spot thus formed;

distinguishing said distance between said metallic interconnection and the objective lens by comparing each said distance at each said position;

bringing the distance between the metallic interconnection and the objective lens into coincidence with a focal length of said objective lens based on the detected distance between the metallic interconnection and the objective lens;

converging the light on said semiconductor wafer by said objective lens;

photographing an image of said semiconductor wafer by detecting the reflected light of the light converged on said semiconductor wafer; and processing the photographed image to inspect said semiconductor wafer.

17. The semiconductor wafer inspecting method according to claim 16, wherein a defocussing magnitude of said light spot is detected based on the reflected light of said light spot, and the distance between said light reflecting pattern and the objective lens is detected from one of a peak value and a bottom value of said defocussing magnitude.

18. The semiconductor wafer inspecting method according to claim 17, wherein said light spot is rendered into a semicircular shape, using a knife edge, to detect the defocussing magnitude of said semicircular light spot.

19. The semiconductor wafer inspecting method according to claim 16, wherein an optical component provided on an optical axis of the light forming said light spot is oscillated to cause oscillations of said light spot.

20. The semiconductor wafer inspecting method according to claim 16, wherein said light spot is oscillated using a galvano-mirror.

* * * * *